United States Patent
Yang et al.

(10) Patent No.: US 10,708,935 B2
(45) Date of Patent: Jul. 7, 2020

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Hanjun Park, Seoul (KR); Jaehyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/734,591

(22) Filed: Jan. 6, 2020

(65) Prior Publication Data

US 2020/0146028 A1     May 7, 2020

Related U.S. Application Data

(63) Continuation of application No. 16/577,424, filed on Sep. 20, 2019, which is a continuation of application No. PCT/KR2019/005677, filed on May 10, 2019.

(Continued)

(30) Foreign Application Priority Data

Sep. 27, 2018  (KR) .................... 10-2018-0115391

(51) Int. Cl.
*H04W 72/12* (2009.01)
*H04L 5/00* (2006.01)
*H04W 72/04* (2009.01)

(52) U.S. Cl.
CPC ....... *H04W 72/1242* (2013.01); *H04L 5/0053* (2013.01); *H04W 72/0413* (2013.01); *H04W 72/1268* (2013.01)

(58) Field of Classification Search
CPC ......... H04W 72/1242; H04W 72/1268; H04W 72/1043; H04W 72/04; H04W 72/12;

(Continued)

(56) References Cited

U.S. PATENT DOCUMENTS

2013/0044653 A1*  2/2013  Yang .................... H04L 1/1671
                                                             370/280
2013/0121299 A1*  5/2013  Kim ....................... H04L 5/001
                                                             370/329

(Continued)

FOREIGN PATENT DOCUMENTS

KR   1020140018258   2/2014
WO   WO2016108665    7/2016

(Continued)

OTHER PUBLICATIONS

Ericsson, "Summary of offline discussion," R1-1805764, 3GPP TSG RAN WG1 Meeting #92, Sanya, China, Apr. 16-20, 2018, 6 pages.

(Continued)

*Primary Examiner* — Sharad Rampuria
(74) *Attorney, Agent, or Firm* — Fish & Richardson P.C.

(57) ABSTRACT

The disclosure relates to a wireless communication system. Particularly, the disclosure relates to a method including determining a first uplink control information (UCI) of a highest priority among a plurality of UCIs, the plurality of UCIs corresponding to a plurality of non-overlapped physical uplink control channel (PUCCH) resources within the same time period, determining a second UCI of a highest priority in a UCI set, based on a format of a PUCCH resource corresponding to the first UCI, and transmitting the first UCI and the second UCI, respectively in PUCCH resources corresponding to the first UCI and the second UCI, and an apparatus for the same.

14 Claims, 13 Drawing Sheets

Related U.S. Application Data

(60) Provisional application No. 62/669,956, filed on May 10, 2018, provisional application No. 62/673,996, filed on May 20, 2018, provisional application No. 62/674,589, filed on May 21, 2018, provisional application No. 62/675,133, filed on May 22, 2018.

(58) Field of Classification Search
CPC .... H04W 76/00; H04L 5/0053; H04B 7/2123; H04J 2203/0069; H04Q 2213/394
See application file for complete search history.

(56) References Cited

U.S. PATENT DOCUMENTS

| | | |
|---|---|---|
| 2013/0208665 A1 | 8/2013 | Baldemair |
| 2014/0247798 A1 | 9/2014 | Lunttila et al. |
| 2018/0123766 A1* | 5/2018 | Ahn .................. H04L 1/18 |
| 2018/0279291 A1 | 9/2018 | Tiirola et al. |
| 2018/0279296 A1 | 9/2018 | Hosseini |
| 2018/0324787 A1 | 11/2018 | Yin |
| 2019/0029012 A1 | 1/2019 | Wu |
| 2019/0045499 A1 | 2/2019 | Huang |
| 2019/0215126 A1 | 7/2019 | Choi |
| 2019/0239216 A1* | 8/2019 | Kundu .................. H04L 5/0044 |
| 2019/0261391 A1 | 8/2019 | Kundu |
| 2019/0306921 A1 | 10/2019 | Wang |

FOREIGN PATENT DOCUMENTS

| | | |
|---|---|---|
| WO | WO2017150942 | 9/2017 |
| WO | WO2017194673 | 11/2017 |
| WO | WO2019157713 | 8/2019 |
| WO | WO2019160846 | 8/2019 |

OTHER PUBLICATIONS

Huawei, HiSilicon, "On UCI multiplexing," R1-1719397, 3GPP TSG RAN WG1 Meeting #91, Reno, USA, dated Nov. 27-Dec. 1, 2017, 9 pages.

Nokia, Nokia Shanghai Bell, "Remaining details for CSI reporting on PUCCH," R1-1800744, 3GPP TSG RAN WG1 Meeting AH 1801, Vancouver, Canada, Jan. 22-26, 2018, 5 pages.

Samsung, "CR to TS 38.213 capturing the RAN1#92bis meeting agreements," R1-1805795, 3GPP TSG-RAN1 Meeting #92bis, Sanya, China, Apr. 16-20, 2018, 99 pages.

ZTE, Sanechips, "Issues related to Long PUCCH," R1-1805262, 3GPP TSG RAN WG1 Meeting #92b, Sanya, China, Apr. 16-20, 2018, 8 pages.

United States Final Office Action in U.S. Appl. No. 16/577,424, dated May 19, 2020, 20 pages.

* cited by examiner

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a continuation of U.S. patent application Ser. No. 16/577,424, filed on Sep. 20, 2019, which is a continuation of the PCT International Application No. PCT/KR2019/005677 filed on May 10, 2019, which claims priority under 35 U.S.C. 119(e) to U.S. Provisional Applications No. 62/669,956, filed on May 10, 2018; No. 62/673,996, filed on May 20, 2018; No. 62/674,589, filed on May 21, 2018; and No. 62/675,133, filed on May 22, 2018 and claims priority under 35 U.S.C. 119(a) to Korean Patent Application No. 10-2018-0115391, filed on Sep. 27, 2018, all of which are incorporated by reference in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system and the like.

DISCLOSURE

Technical Problem

An aspect of the present disclosure is to provide a method of efficiently transmitting/receiving a wireless signal in a wireless communication and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting control information by a communication device in a wireless communication system includes determining a first Uplink Control Information (UCI) with a highest priority among a plurality of UCIs, wherein the plurality of UCIs corresponds to a plurality of non-overlapped Physical Uplink Control Channel (PUCCH) resources in a same time interval; determining a second UCI with a highest priority among a set of UCIs, based on a format of a PUCCH resource corresponding to the first UCI; and transmitting the first and second UCIs using corresponding PUCCH resources, respectively, wherein in case that the PUCCH resource corresponding to the first UCI is of a first format, the set of UCIs includes the plurality of UCIs except the first UCI, wherein in case that the PUCCH resource corresponding to the first UCI is of a second format, the set of UCIs includes one or more UCIs corresponding to PUCCH resources of the first format only, among the plurality of UCIs, and wherein a PUCCH resource of the first format has a duration of shorter than a value, and a PUCCH resource of the second format has a duration of equal to or larger than the value.

In another aspect of the present disclosure, a communication device used in a wireless communication system includes a memory and a processor. The processor is configured to determine a first Uplink Control Information (UCI) with a highest priority among a plurality of UCIs, wherein the plurality of UCIs corresponds to a plurality of non-overlapped Physical Uplink Control Channel (PUCCH) resources in a same time interval, determine a second UCI with a highest priority among a set of UCIs, based on a format of a PUCCH resource corresponding to the first UCI, and transmit the first and second UCIs using corresponding PUCCH resources, respectively, wherein in case that the PUCCH resource corresponding to the first UCI is of a first format, the set of UCIs includes the plurality of UCIs except the first UCI, wherein in case that the PUCCH resource corresponding to the first UCI is of a second format, the set of UCIs includes one or more UCIs corresponding to PUCCH resources of the first format only, among the plurality of UCIs, and wherein a PUCCH resource of the first format has a duration of shorter than a value, and a PUCCH resource of the second format has a duration of equal to or larger than the value.

In another aspect of the present disclosure, a method of receiving control information by a communication device in a wireless communication system includes determining a first Uplink Control Information (UCI) with a highest priority among a plurality of UCIs, wherein the plurality of UCIs corresponds to a plurality of non-overlapped Physical Uplink Control Channel (PUCCH) resources in a same time interval; determining a second UCI with a highest priority among a set of UCIs, based on a format of a PUCCH resource corresponding to the first UCI; and receiving the first and second UCIs using corresponding PUCCH resources, respectively, wherein in case that the PUCCH resource corresponding to the first UCI is of a first format, the set of UCIs includes the plurality of UCIs except the first UCI, wherein in case that the PUCCH resource corresponding to the first UCI is of a second format, the set of UCIs includes one or more UCIs corresponding to PUCCH resources of the first format only, among the plurality of UCIs, and wherein a PUCCH resource of the first format has a duration of shorter than a value, and a PUCCH resource of the second format has a duration of equal to or larger than the value.

In another aspect of the present disclosure, a communication device used in a wireless communication system includes a memory and a processor. The processor is configured to: determine a first Uplink Control Information (UCI) with a highest priority among a plurality of UCIs, wherein the plurality of UCIs corresponds to a plurality of non-overlapped Physical Uplink Control Channel (PUCCH) resources in a same time interval, determine a second UCI with a highest priority among a set of UCIs, based on a format of a PUCCH resource corresponding to the first UCI, and receive the first and second UCIs using corresponding PUCCH resources, respectively, wherein in case that the PUCCH resource corresponding to the first UCI is of a first format, the set of UCIs includes the plurality of UCIs except the first UCI, wherein in case that the PUCCH resource corresponding to the first UCI is of a second format, the set of UCIs includes one or more UCIs corresponding to PUCCH resources of the first format only, among the plurality of UCIs, and wherein a PUCCH resource of the first format has a duration of shorter than a value, and a PUCCH resource of the second format has a duration of equal to or larger than the value.

The PUCCH resource of the first format may have one to two symbol duration, and the PUCCH resource of the second format may have four or more symbol duration.

The plurality of UCIs may be of a same UCI type. Herein, the same UCI type may be Acknowledgement/Negative acknowledgement (A/N), Channel State Information (CSI), or Scheduling Request (SR).

The communication device may include a device used for a self-driving vehicle.

Advantageous Effects

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as universal terrestrial radio access (UTRA) or CDMA2000. TDMA can be implemented as a radio technology such as global system for mobile communications (GSM)/general packet radio service (GPRS)/enhanced data rates for GSM evolution (EDGE). OFDMA can be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved UTRA (E-UTRA). UTRA is a part of universal mobile telecommunications system (UMTS). 3rd generation partnership project (3GPP) long term evolution (LTE) is part of evolved UMTS (E-UMTS) using E-UTRA, and LTE-advanced (A) is an evolved version of 3GPP LTE. 3GPP new radio or new radio access technology (NR) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Figure 1:
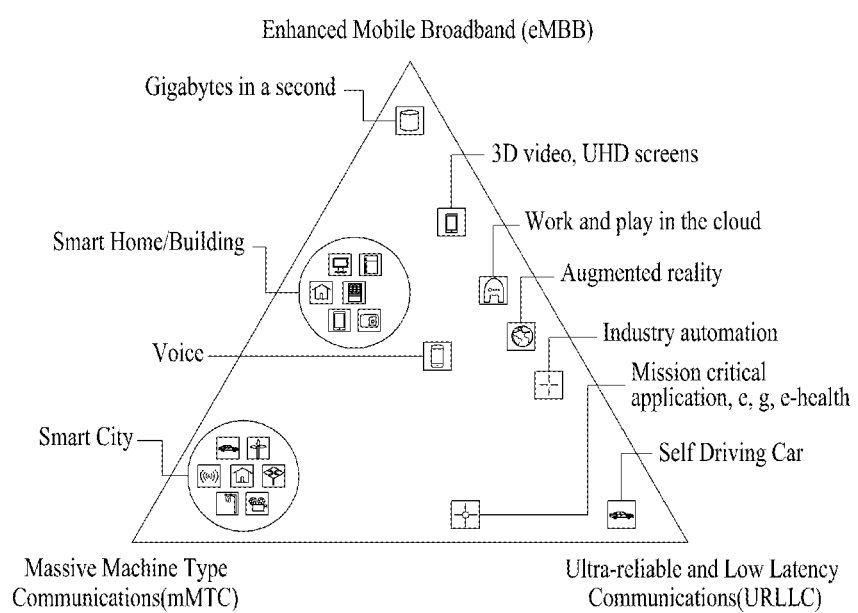
FIG. 1 illustrates exemplary $5^{th}$ generation (5G) usage scenarios.

FIG. 1 illustrates exemplary $5^{th}$ generation (5G) usage scenarios.

Referring to FIG. 1, three key requirement areas of 5G (e.g., NR) include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases included in a triangle in FIG. 1 will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 2:
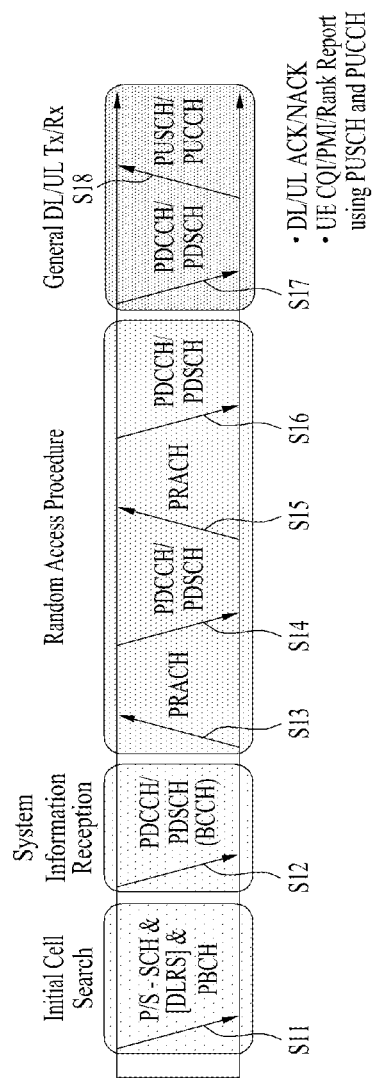
FIG. 2 illustrates physical channels used in a $3^{rd}$ generation partnership project (3GPP) system, which is an example of wireless communication systems, and a general signal transmission method using the same.

FIG. 2 illustrates physical channels used in a 3GPP NR system and a general signal transmission method using the same.

When powered on or when a UE initially enters a cell, the UE performs initial cell search involving synchronization with a BS in step S101. For initial cell search, the UE synchronizes with the BS and acquires information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 3:
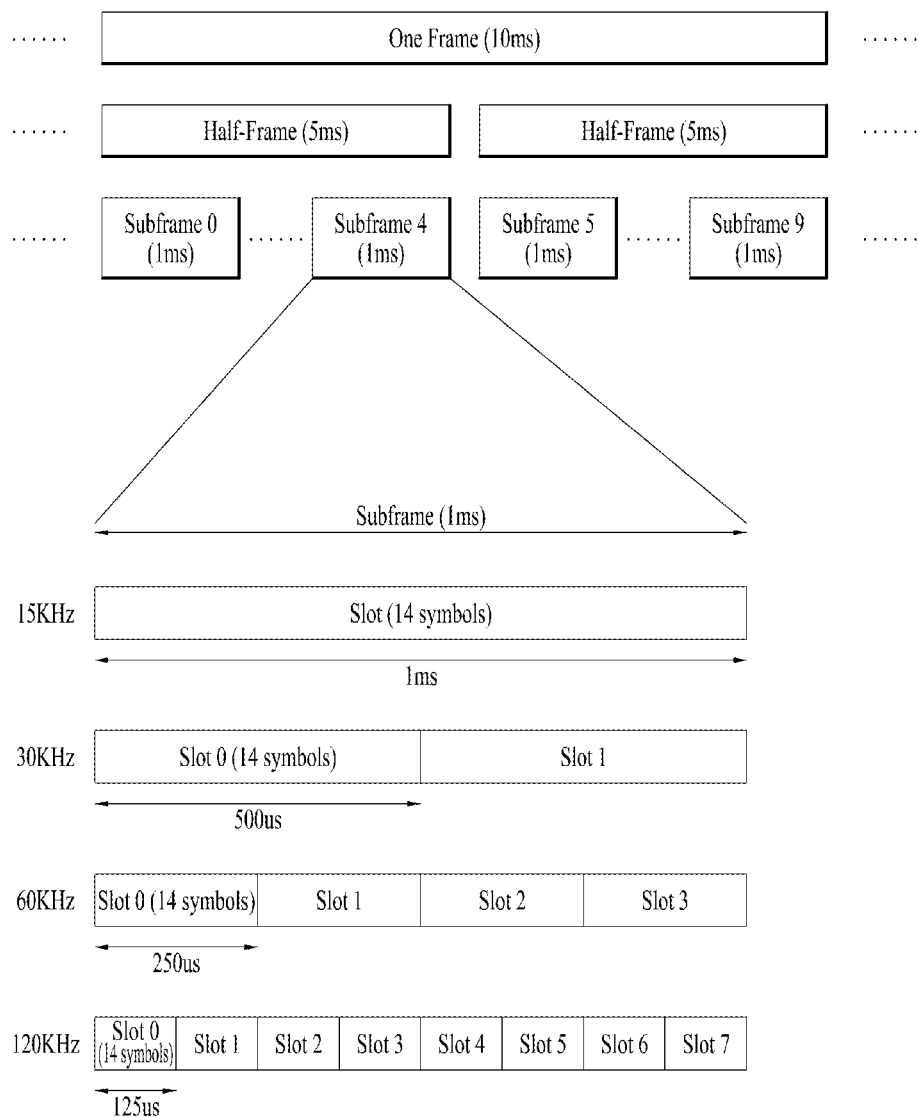
FIG. 3 illustrates a radio frame structure.

FIG. 3 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a Discrete Fourier Transform-spread-OFDM (DFT-s-OFDM) symbol).

Figure 4:
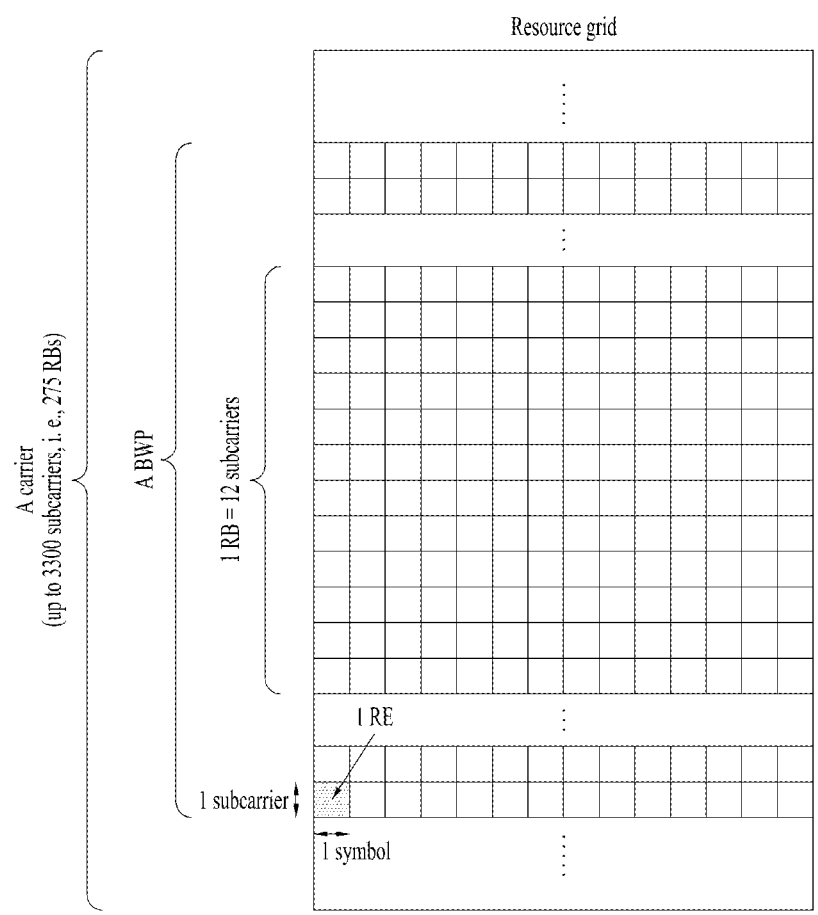
FIG. 4 illustrates a resource grid of a slot.

FIG. 4 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 5:
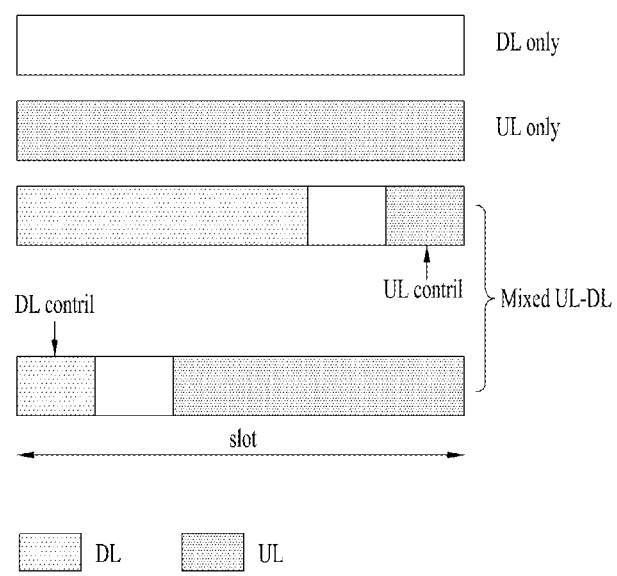
FIG. 5 illustrates a structure of a self-contained slot.

FIG. 5 illustrates a structure of a self-contained slot. In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. There may be a time gap for DL-to-UL or UL-to-DL switching between the control region and the data region. For example, the following configurations may be considered. Corresponding intervals are listed in temporal order.
 1. DL only configuration
 2. UL only configuration
 3. Mixed UL-DL configuration
    DL region+Guard Period (GP)+UL control region;
    DL control region+GP+UL region,
    DL region: (i) DL data region or (ii) DL control region+ DL data region;
    UL region: (i) UL data region or (ii) UL data region+UL control region.

Figure 6:
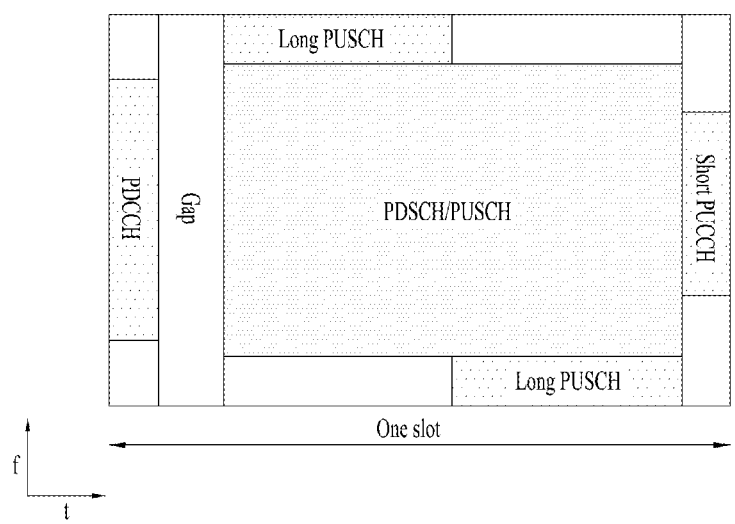
FIG. 6 illustrates an example in which a physical channel is mapped to a self-contained slot.

FIG. 6 illustrates an example in which a physical channel is mapped into a self-contained slot. A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a subframe may be configured as the GP.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

The PDCCH consists of 1, 2, 4, 8, or 16 Control Channel Elements (CCEs) depending on an aggregation level (AL). The CCE is a logical allocation unit used to provide a PDCCH having a predetermined code rate according to a radio channel state. A CCE consists of 6 Resource Element Groups (REGs). A REG is defined by one OFDM symbol and one (P)RB. The PDCCH is transmitted through a Control Resource Set (CORESET). The CORESET is defined as a REG set having a given numerology (e.g., SCS, CP length). A plurality of CORESETs for one UE may overlap with each other in the time/frequency domain. A CORESET may be configured through system information (e.g., a Master Information Block (MIB)) or UE-specific higher layer (e.g. Radio Resource Control (RRC) layer) signaling. Specifically, the number of RBs and the number of OFDM symbols (a maximum of 3 OFDM symbols) that constitute the CORESET may be configured by higher layer signaling.

To receive/detect a PDCCH, the UE monitors PDCCH candidates. The PDCCH candidates represent the CCE(s) that the UE should monitor for PDCCH detection. Each PDCCH candidate is defined as 1, 2, 4, 8, or 16 CCEs depending on the AL. The monitoring includes (blind) decoding of the PDCCH candidates. A set of PDCCH candidates monitored by the UE is defined as a PDCCH Search Space (SS). The SS includes a common search space (CSS) or a UE-specific search space (USS). The UE may acquire DCI by monitoring the PDCCH candidates in one or more SSs configured by the MIB or higher layer signaling. Each CORESET is associated with one or more SSs, and each of the SSs is associated with one COREST. The SSs may be defined based on the following parameters.

controlResourceSetId: Indicates a CORESET associated with an SS;

monitoringSlotPeriodicityAndOffset: Indicates a PDCCH monitoring periodicity (in units of slots) and a PDCCH monitoring interval offset (in units of slots);

monitoringSymbolsWithinSlot: Indicates PDCCH monitoring symbols in a slot (e.g. the first symbol(s) of the CORESET);

nrofCandidates: Indicates the number of PDCCH candidates (one of 0, 1, 2, 3, 4, 5, 6, and 8) for each AL={1, 2, 4, 8, 16}.

An occasion (e.g., time/frequency resources) in which PDCCH candidates should be monitored is defined as a PDCCH (monitoring) occasion. One or more PDCCH (monitoring) occasions may be configured in a slot.

Table 3 exemplarily shows the features of the respective search space types.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 exemplarily shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling of a TB-based (or TB-level) PUSCH, and DCI format 0_1 may be used for scheduling of a TB-based (or TB-level) PUSCH or a Code Block Group (CBG)-based (or CBG-level) PUSCH. DCI format 1_0 may be used for scheduling of a TB-based (or TB-level) PDSCH, and DCI format 1_1 may be used for scheduling of a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used to deliver dynamic slot format information (e.g., dynamic SFI) to the UE, and DCI format 2_1 is used to deliver downlink pre-emption information to the UE. DCI format 2_0 and/or DCI format 2_1 may be delivered to UEs in a group on a group common PDCCH, which is a PDCCH delivered to UEs defined as one group.

DCI format 0_0 and DCI format 1_0 may be referred to as fallback DCI formats, and DCI format 0_1 and DCI format 1_1 may be referred to as non-fallback DCI formats. For the fallback DCI formats, the same DCI size/field configuration is maintained regardless of the UE configuration. On the other hand, for the non-fallback DCI formats, the DCI size/field configuration varies according to the UE configuration.

The PDSCH carries downlink data (e.g., DL-SCH transport block (DL-SCH TB)), and a modulation technique such as Quadrature Phase Shift Keying (QPSK), 16 Quadrature Amplitude Modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a Demodulation Reference Signal (DMRS) to generate an OFDM symbol signal and transmit the signal through a corresponding antenna port.

The PUCCH carries Uplink Control Information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

Table 5 exemplarily shows PUCCH formats. PUCCH formats may be divided into Short PUCCHs (Formats 0 and 2) and Long PUCCHs (Formats 1, 3, and 4) based on the PUCCH transmission duration.

TABLE 5

| PUCCH format | Length in OFDM symbols $N^{PUCCH}_{symb}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a size of up to 2 bits, and is mapped based on a sequence and transmitted. Specifically, a UE transmits one of a plurality of sequences on a PUCCH corresponding to PUCCH format 0 to transmit specific UCI to the eNB. Only when transmitting a positive SR, the UE transmits a PUCCH corresponding to PUCCH format 0 within a PUCCH resource for the corresponding SR configuration.

PUCCH format 1 carries UCI having a size of up to 2 bits, and the modulation symbols therefor are spread by an orthogonal cover code (OCC) (configured differently depending on whether frequency hopping is performed) in the time domain. The DMRS is transmitted on a symbol on which a modulation symbol is not transmitted (namely, the DMRS is transmitted through time division multiplexing (TDM)).

PUCCH format 2 carries UCI having a bit size larger than 2 bits, and the modulation symbols are transmitted through frequency division multiplexing (FDM) with the DMRS. The DM-RS is positioned on symbol indexes #1, #4, #7 and #10 in a resource block given with a density of 1/3. A Pseudo Noise (PN) sequence is used for the DM_RS sequence. For two-symbol PUCCH format 2, frequency hopping may be enabled.

PUCCH format 3 is not subjected to UE multiplexing in the same physical resource block, but carries UCI having a bit size larger than 2 bits. In other words, the PUCCH resource of PUCCH format 3 does not include an OCC. The modulation symbols are transmitted through time division multiplexing (TDM) with the DMRS.

PUCCH format 4 supports multiplexing with up to 4 UEs in the same physical resource blocks and carries UCI having a bit size larger than 2 bits. In other words, the PUCCH resource of PUCCH format 3 includes an OCC. The modulation symbols are transmitted through time division multiplexing (TDM) with the DMRS.

The PUSCH carries uplink data (e.g., UL-SCH transport block (UL-SCH TB)) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 7:
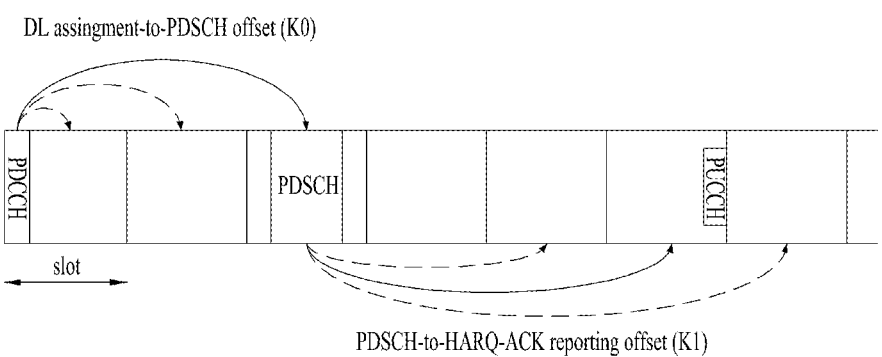
FIG. 7 illustrates an acknowledgement/negative acknowledgement (ACK/NACK) transmission procedure.

FIG. 7 illustrates an ACK/NACK transmission procedure. Referring to FIG. 7, the UE may detect a PDCCH in slot # n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment: Indicates an RB set assigned to the PDSCH.

Time domain resource assignment: Indicates K0 and the starting position (e.g. OFDM symbol index) and duration (e.g. the number of OFDM symbols) of the PDSCH in a slot.

PDSCH-to-HARQ feedback timing indicator: Indicates K1.

After receiving the PDSCH in slot #(n+K0) according to the scheduling information of slot # n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Figure 8:
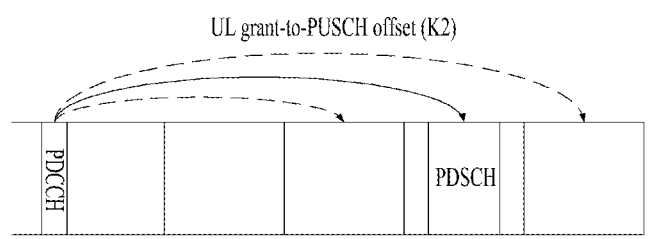
FIG. 8 illustrates an exemplary physical uplink shared channel (PUSCH) transmission procedure.

FIG. 8 illustrates an exemplary PUSCH transmission procedure. Referring to FIG. 8, a UE may detect a PDCCH in slot # n. The PDCCH may include UL scheduling information (e.g., DCI format 0_0, DCI format 0_1). DCI format 0_0 and DCI format 0_1 may include the following information.

Frequency domain resource assignment: this indicates an RB set allocated to a PUSCH.

Time domain resource assignment: this specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot # n. The PUSCH includes a UL-SCH TB.

Figure 9:
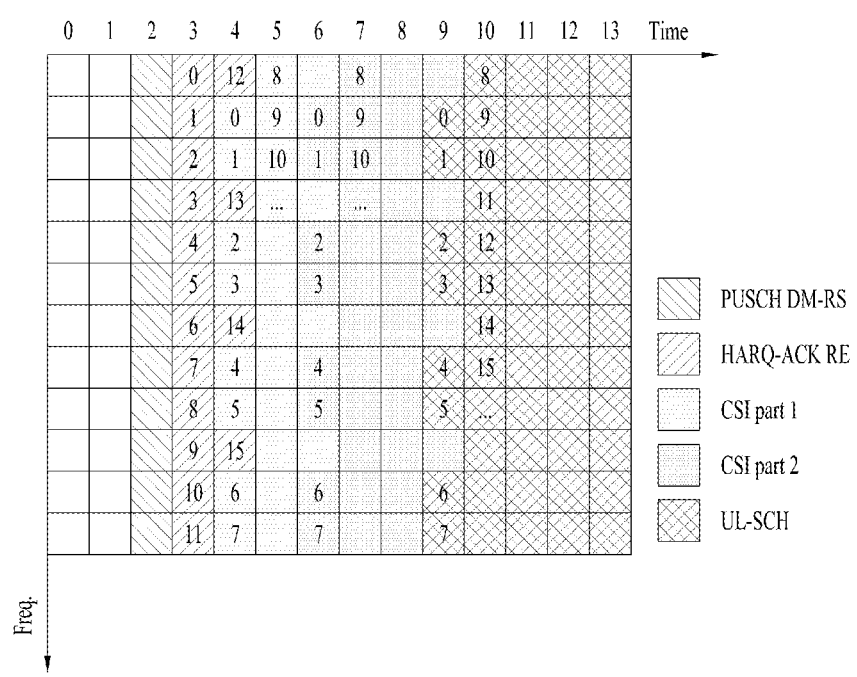
FIG. 9 illustrates exemplary multiplexing control information in a PUSCH.

FIG. 9 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 9, an HARQ-ACK and CSI are carried in a PUSCH resource.

Embodiment: UL Transmission

Deployment of a plurality of logical networks on a single physical network is under consideration in the NR system. The logical networks should be able to support services having various requirements (e.g., eMBB, mMTC, URLLC, etc.). Accordingly, the NR physical layer is designed so as to support a flexible transmission structure in consideration of requirements for various services. For example, the NR physical layer may change an OFDM symbol length (OFDM symbol duration) and a subcarrier spacing (SCS) (hereinafter, referred to as an OFDM numerology), when needed. Further, transmission resources of physical channels may be changed within a predetermined range (in symbols). In NR, for example, the transmission lengths/starting transmission times of a PUCCH (PUCCH resource) and a PUSCH (PUSCH resource) may be configured flexibly within a predetermined range.

In a wireless communication system including eNBs and UEs, when a UE transmits UCI on a PUCCH, a PUCCH resource may overlap with another PUSCH resource or a PUSCH resource. From the perspective of the same UE, for example, (1) a PUCCH (PUCCH resource) and another PUCCH (PUCCH resource) (for transmission of different UCIs) or (2) a PUCCH (PUCCH resource) and a PUSCH (PUSCH resource) may overlap with each other on the time axis (in the same slot). The UE may not support PUCCH-PUCCH simultaneous transmission or PUCCH-PUSCH simultaneous transmission (according to limited capabilities of the UE or configuration information received from an eNB). In this case, the UE may preferably multiplex and transmit (1) different UCIs or (2) UCI(s) and UL data, as much as possible. However, (1) a PUCCH (PUCCH resource) and another PUCCH (PUCCH resource) or (2) a PUCCH (PUCCH resource) and a PUSCH (PUSCH resource), which overlap with each other on the time axis (in a slot) may differ in transmission lengths (e.g., the numbers of symbols) and/or starting transmission times (e.g., starting symbols) in the NR system. Therefore, from the perspective of a processing time at the UE, the UE may have difficulty in multiplexing (1) different UCIs or (2) UCI(s) and UL data, for transmission. For example, a PUCCH carrying an acknowledgement/negative acknowledgement (A/N) (hereinafter, referred to as an A/N PUCCH) may (fully or partially) overlap with a PUCCH carrying an SR (hereinafter, referred to as an SR PUCCH) on the time axis. In this case, upon recognition of the existence of the A/N PUCCH overlapped with the SR PUCCH after the UE starts to transmit the SR PUCCH or completes preparation for transmission of the SR PUCCH, it may be difficult for the UE to multiplex and transmit the A/N and the SR in the A/N PUCCH.

In the existing NR system, if an A/N PUCCH resource fully overlaps with an SR PUCCH resource on the time axis (i.e., the transmission periods of an A/N PUCCH and an SR PUCCH coincide with each other), the following UCI multiplexing rule is applied according to the PUCCH format of the A/N PUCCH. Herein, a positive SR indicates the presence of UL data to be transmitted by a UE, and a negative SR indicates the absence of UL data to be transmitted by the UE.

(1) Case in which the A/N PUCCH is in PUCCH format 0.
 A. If the UCI state of an SR is positive SR,
  an A/N is transmitted in a resource resulting from applying a CS/OCC/PRB offset to an A/N PUCCH.
 B. If the UCI state of the SR is negative SR,
  the A/N is transmitted in an A/N PUCCH resource.

(2) Case in which the A/N PUCCH is in PUCCH format 1.
 A. If the UCI state of the SR is positive SR,
  the A/N is transmitted in an SR PUCCH resource.
 B. If the UCI state of the SR is negative SR,
  the A/N is transmitted in the A/N PUCCH resource.

(3) Case in which the A/N PUCCH is in one of PUCCH formats 2, 3 and 4.
 A. If the UCI state of the SR is positive SR or negative SR,
  UCI payload is generated by representing an SR by explicit bit(s) and appending the SR to the A/N, and the generated UCI is transmitted in the A/N PUCCH resource.

However, the conventional approach defines a UCI multiplexing scheme only for the case where an A/N PUCCH resource and an SR PUCCH resource fully overlap with each other on the time axis. Accordingly, there is a need for discussing a UCI multiplexing scheme in consideration of various scenarios, for efficient UCI transmission.

To address the above-described problem, an operation of multiplexing UCI and/or data in UL channel(s) overlapped with each other on the time axis is proposed in the present disclosure. Specifically, an operation of multiplexing UCI and/or data of UL channel(s) overlapped with each other on the time axis, taking into account the starting transmission time(s) and/or UE processing time(s) of the UL channel(s) is proposed in the present disclosure.

Terms as used herein are first defined as follows.

UCI: UL control information transmitted by a UE. The UCI includes multiple types of control information (i.e., UCI types). For example, the UCI may include HARQ-ACK (shortly, A/N or AN), SR, and CSI.

PUCCH: A physical UL channel carrying UCI. For the convenience, PUCCH resources configured and/or indicated for transmitting an A/N, an SR, and CSI by an eNB are referred to as an A/N PUCCH resource, an SR PUCCH resource, and a CSI PUCCH resource, respectively.

PUSCH: A physical UL channel carrying UL data.

UCI multiplexing: It may mean an operation of transmitting different UCIs (UCI types) on a common physical UL channel (e.g., a PUCCH or a PUSCH). UCI multiplexing may include multiplexing of different UCIs (UCI types). For the convenience, the multiplexed UCI is referred to as MUX UCI. Further, the UCI multiplexing may include an operation performed in relation to MUX UCI. For example, the UCI multiplexing may include a process of determining a UL channel resource to transmit MUX UCI.

UCI/data multiplexing: It may mean an operation of transmitting UCI and data on a common physical UL channel (e.g., PUSCH). UCI/data multiplexing may include an operation of multiplexing UCI with data. For the convenience, the multiplexed UCI is referred to as MUX UCI/Data. Further, UCI/data multiplexing may include an operation performed in relation to MUC UCI/Data. For example, the UCI/data multiplexing may include a process of determining UL channel resources to transmit MUX UCI/Data.

Slot: It is a basic time unit (TU) (or time interval) for data scheduling. A slot includes a plurality of symbols. Herein, a symbol may be an OFDM-based symbol (e.g., a CP-OFDM symbol or a DFT-s-OFDM symbol). In the present disclosure, the terms, symbol, OFDM-based symbol, OFDM symbol, CP-OFDM symbol, and DFT-s-OFDM symbol may be interchangeably used.

Overlapped UL channel resource(s): It means UL channel (e.g., PUCCH and PUSCH) resource(s) overlapped (at least partially) with each other on the time axis within a predetermined time period (e.g., slot). The overlapped UL channel resource(s) may mean UL channel resource(s) prior to UCI multiplexing.

The following PUCCH formats may be defined according to UCI payload sizes and/or transmission lengths (e.g., the numbers of symbols included in PUCCH resources). In regard to the PUCCH formats, Table 5 may also be referred to.

(0) PUCCH format 0 (PF0 or F0)
Supported UCI payload size: up to K bits (e.g., K=2)
Number of OFDM symbols in single PUCCH: 1 to X symbols (e.g., X=2)
Transmission structure: Only a UCI signal without DM-RS is included, and a UCI state is transmitted by selecting and transmitting one of a plurality of sequences.

(1) PUCCH format 1 (PF1 or F1)
Supported UCI payload size: up to K bits (e.g., K=2)
Number of OFDM symbols in single PUCCH: Y to Z symbols (e.g., Y=4 and Z=14)
Transmission structure: DM-RS and UCI are configured in TDM in different OFDM symbols, and the UCI is the product between a specific sequence and modulation symbols (e.g., QPSK symbols). CDM between a plurality of PUCCH resources (conforming to PUCCH format 1) (within the same RB) is supported by applying cyclic shifts(CSs)/orthogonal cover codes (OCCs) to both of the UCI and the DM-RS.

(2) PUCCH format 2 (PF2 or F2)
Supported UCI payload size: more than K bits (e.g., K=2)
Number of OFDM symbols in single PUCCH: 1 to X symbols (e.g., X=2)
Transmission structure: DM-RS and UCI are configured/mapped in FDM within the same symbol, and encoded UCI bits are subjected only to IFFT without DFT, for transmission.

(3) PUCCH format 3 (PF3 or F3)
Supported UCI payload size: more than K bits (e.g., K=2)
Number of OFDM symbols in single PUCCH: Y to Z symbols (e.g., Y=4 and Z=14)
Transmission structure: DM-RS and UCI are configured/mapped in TDM in different OFDM symbols, and encoded UCI bits are subjected to DFT, for transmission. Multiplexing between a plurality of UEs is supported by applying an OCC to the UCI and a CS (or IFDM mapping) to the DM-RS at the front end of DFT.

(4) PUCCH format 4 (PF4 or F4)
Supported UCI payload size: more than K bits (e.g., K=2)
Number of OFDM symbols in single PUCCH: Y to Z symbols (e.g., Y=4 and Z=14)
Transmission structure: DM-RS and UCI are configured/mapped in TDM in different OFDM symbols, and encoded UCI bits are subjected to DFT, without multiplexing between UEs.

A PUCCH resource may be determined on a UCI type basis (e.g., for each of A/N, SR, and CSI). A PUCCH resource used for UCI transmission may be determined based on the size of the UCI (UCI payload). For example, the eNB may configure a plurality of PUCCH resource sets for the UE, and the UE may select a specific PUCCH resource set corresponding to a specific range according to a range of UCI (UCI payload) sizes (e.g., numbers of UCI bits). For example, the UE may select one of the following PUCCH resource sets according to the number of UCI bits, $N_{UCI}$.

PUCCH resource set #0, if the number of UCI bits≤2
PUCCH resource set #1, if 2<the number of UCI bits≤$N_1$
...
PUCCH resource set #(K−1), if $N_{K-2}$<the number of UCI bits≤$N_{K-1}$ Herein, K represents the number of PUCCH resource sets (K>1), and $N_i$ represents a maximum number of UCI bits supported by PUCCH resource set # i. For example, PUCCH resource set #1 may include resources of PUCCH formats 0 to 1, and the other PUCCH resource sets may include resources of PUCCH formats 2 to 4 (see Table 5), If SR and CSI are given as UCI types, PUCCH resources to be used for UCI transmission in a PUCCH resource set may be configured by higher-layer signaling (e.g., RRC signaling). If HARQ-ACK for a semi-persistent scheduling (SPS) PDSCH is given as a UCI type, a PUCCH resource to be used for UCI transmission in a PUCCH resource set may be configured by higher-layer signaling (e.g., RRC signaling). On the other hand, if HARQ-ACK for a normal PDSCH (i.e., a PDSCH scheduled by DCI) is given as a UCI type, a PUCCH resource to be used for UCI transmission in a PUCCH resource set may be scheduled by DCI.

In the case of DCI-based PUCCH resource scheduling, the eNB may transmit DCI to the UE on a PDCCH, and indicate a PUCCH resource to be used for UCI transmission in a specific PUCCH resource set by an ACK/NACK resource indicator (ARI) in the DCI. The ARI is used to indicate a PUCCH resource for ACK/NACK transmission, also referred to as a PUCCH resource indicator (PRI). Herein, the DCI may be used for PDSCH scheduling, and the UCI may include an HARQ-ACK for a PDSCH. For the UE, the eNB may configure a PUCCH resource set including more PUCCH resources than states representable by the ARI by (UE-specific) higher-layer signaling (e.g., RRC signaling). The ARI may indicate a PUCCH resource subset of the PUCCH resource set, and which PUCCH resource in the indicated PUCCH resource subset to be used may be determined according to an implicit rule based on transmission resource information about a PDCCH (e.g., the starting CCE index of the PDCCH or the like).

Unless conflicting with each other, each of the following proposed methods may be applied in conjunction with other proposed methods.

PUCCH/PUCCH Multiplexing

[Proposed method #1] an A/N PUCCH resource and an SR PUCCH resource may overlap with each other on the time axis (over all or part of the OFDM symbols of a PUCCH). In this case, the UE may determine whether to multiplex an A/N with a (positive) SR depending on whether an A/N PUCCH resource corresponding to (or indicated by) PDSCH(s) (and/or PDCCH(s)) which has been received (or of which the transmission has started) until a specific time (earlier than a reference time) overlaps with the SR PUCCH resource on the time axis.

However, if the UE does not multiplex the A/N with the (positive) SR, the UE may drop the transmission of one of the A/N and the (positive) SR.

For example, the UE may determine whether to multiplex the A/N with the (positive) SR depending on whether an A/N PUCCH resource corresponding to (or indicated by) PDSCH(s) (and/or PDCCH(s)) which has been received (or of which the transmission has started) until a time Tref,sr earlier than the starting transmission time (e.g., starting symbol) Tsr of the SR PUCCH by $T_0$ overlaps with the SR PUCCH resource on the time axis. Tref,sr may be defined as Tref,sr=Tsr−$T_0$ and represented in OFDM symbols.

(Case 1) If the A/N PUCCH resource corresponding to (or indicated by) the PDSCH(s) (and/or PDCCH(s)) which has been received (or of which the transmission has started) until Tref,sr overlaps with the SR PUCCH resource on the time axis, the UE may multiplex the A/N with the (positive) SR and transmit the multiplexed A/N and (positive) SR (or the UE may follow the UCI multiplexing rule applied to the case where an A/N PUCCH and an SR PUCCH overlap with each other over all symbols of a PUCCH on the time axis).

(1) The A/N PUCCH is in PUCCH format 0.

A. If the UCI state of the SR is positive SR, the A/N is transmitted in a resource resulting from applying a CS/OCC/PRB offset to the A/N PUCCH.

B. If the UCI state of an SR is negative SR, the A/N is transmitted in the A/N PUCCH resource.

(2) The A/N PUCCH is in PUCCH format 1.

A. If the UCI state of the SR is positive SR, the A/N is transmitted in the SR PUCCH resource. However, if the SR PUCCH is in PUCCH format 0, only the A/N may be transmitted, while the SR transmission is dropped.

B. If the UCI state of the SR is negative SR, the A/N is transmitted in the A/N PUCCH resource.

(3) The A/N PUCCH is in one of PUCCH formats 2, 3 and 4.

A. If the UCI state of the SR is positive SR or negative SR,

UCI payload is generated by representing the SR in explicit bit(s) and appending the SR to the A/N, and the generated UCI is transmitted in the A/N resource.

(Case 2) In any other case than (Case 1), the UE may select and transmit one of the A/N and the (positive) SR. For example, (i) if an A/N PUCCH resource corresponding to (or indicated by) PDSCH(s) (and/or PDCCH(s)) which has been received (or of which the transmission has started/ended) after Tref,sr overlaps with the SR PUCCH resource on the time axis, (ii) if an A/N PUCCH resource corresponding to (or indicated by) the PDSCH(s) (and/or PDCCH(s)) which has been received (or of which the transmission has started) until Tref,sr does not overlap with the SR PUCCH resource on the time axis, or (iii) if there is no A/N PUCCH resource corresponding to (or indicated by) the PDSCH(s) (and/or PDCCH(s)) which has been received (or of which the transmission has started) until Tref,sr, the UE may select and transmit one of the A/N and the (positive) SR.

(1) If the UCI state of the SR is positive SR, the SR is transmitted in the SR PUCCH resource (the A/N transmission is dropped).

(2) If the UCI state of the SR is negative SR, the A/N is transmitted in the A/N PUCCH resource.

$T_0$ may be one of the following values. $T_0$ may be represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

[Proposed method #1] may also be extended to any other PUCCH than the A/N PUCCH.

In the NR system, if the starting (OFDM) symbols (or starting times) of an A/N PUCCH and an SR PUCCH coincide with each other, a UE operation of applying the UCI multiplexing rule configured for the case in which an A/N PUCCH and an SR PUCCH fully overlap with each other has been agreed on. On the other hand, if the starting (OFDM) symbols (or starting times) of an A/N PUCCH and an SR PUCCH are different, a method of determining whether to multiplex an A/N with an SR by comparing the A/N PUCCH with the SR PUCCH in terms of their starting (OFDM) symbols (or starting times) has been discussed. For example, if the starting (OFDM) symbol of the SR PUCCH is earlier than the starting (OFDM) symbol of the A/N PUCCH, the UE may transmit the SR PUCCH, dropping the A/N transmission. On the contrary, if the starting (OFDM) symbol of the SR PUCCH is later than the starting (OFDM) symbol of the A/N PUCCH, the UE may UCI-multiplex the SR and the A/N and transmit the multiplexed SR and A/N on a single PUCCH. It seems that this operation has been proposed in that if the UE is aware of the presence of the A/N transmission after preparing for the SR transmission (or during the SR transmission), an operation of UCI-multiplexing the A/N and the SR and transmitting the multiplexed A/N and SR, while canceling the SR transmission is difficult in terms of UE implementation. However, even though the starting (OFDM) symbol of the SR PUCCH is earlier than the starting (OFDM) symbol of the A/N PUCCH, if a PDSCH (and/or a PDCCH) corresponding to the A/N PUCCH has been received much earlier, the UE may transmit the A/N and the SR through UCI multiplexing. Therefore, the conventional method is not preferable in that even a UE capable of UCI-multiplexing an A/N and an SR in terms of a UE processing time drops the A/N transmission.

Therefore, to support multiplexing between an A/N and an SR, a time point based on which the UE may determine whether to transmit (i) SR only or (ii) the SR and the A/N through multiplexing may be clearly indicated to the UE. For example, if a A/N PUCCH resource for PDSCH(s) (and/or PDCCH(s)) received until a time Tref,sr earlier than the starting transmission time Tsr of a specific SR PUCCH by $T_0$ does not overlap with an SR PUCCH resource on the time axis, the UE may determine to transmit the SR PUCCH, if the SR is a positive SR. Herein, even though an A/N PUCCH resource for PDSCH(s) (and/or PDCCH(s)) received after Tref,sr overlaps with the SR PUCCH resource on the time axis, the UE may transmit the SR PUCCH, dropping the A/N transmission. On the other hand, if the A/N PUCCH resource for the PDSCH(s) (and/or the PDCCH(s)) received until Tref,sr overlaps with the SR PUCCH resource on the time axis, (i) when SR information is a positive SR, the UE may UCI-multiplex the A/N and the SR and transmit the multiplexed A/N and SR in a single PUCCH resource, and (ii) when the SR information is a negative SR, the UE may transmit only the A/N on the A/N PUCCH or may append explicit bit(s) representing the negative SR to the A/N and transmit the A/N appended with the explicit bit(s) on the A/N PUCCH.

Even though the A/N PUCCH resource is updated later not to overlap with the SR PUCCH, since the UE has already determined to UCI-multiplex the A/N and the SR, the UE may still transmit UCI-multiplexed A/N and SR in a single PUCCH resource, without cancelling the determination.

Figure 10:
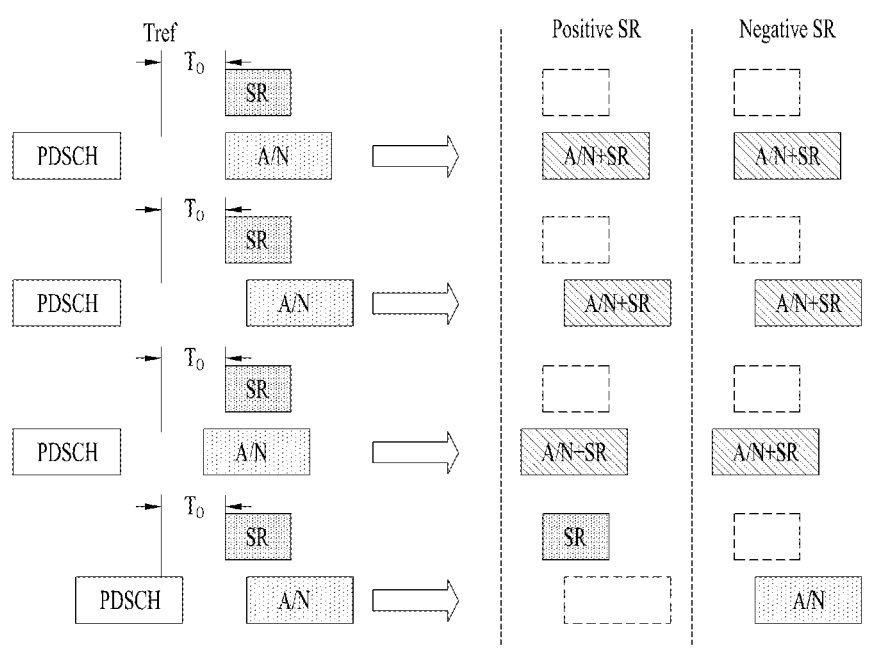
FIGS. 10 to 13 illustrate exemplary signal transmissions according to the present disclosure.
Figure 11:
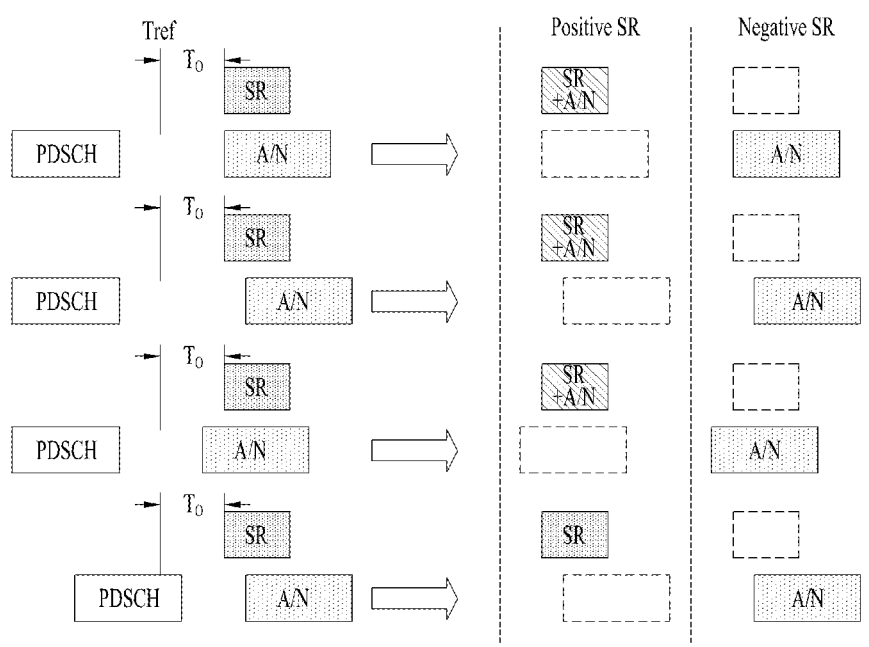

FIG. 10 illustrates an exemplary operation for an A/N PUCCH of PUCCH formats 0/2/3/4. FIG. 11 illustrates an exemplary operation for an A/N PUCCH of PUCCH format 1.

[Proposed method #1] is based on the assumption that the UE is capable of identifying the presence or absence of an A/N PUCCH corresponding to PDSCH(s) (and/or PDCCH(s)) terminated/received before Tref,sr (i.e., Tsr–To), before determining to transmit an SR PUCCH. That is, in [proposed method #1], it is considered that the UE has difficulty in identifying the presence or absence of an A/N PUCCH corresponding to PDSCH(s) (and/or PDCCH(s)) terminated/received after Tref,sr, before the UE determines to transmit the SR PUCCH, and thus the presence or absence of the A/N PUCCH is not taken into account in determining whether the A/N and the SR are to be multiplexed. According to [proposed method #1], if an A/N PUCCH resource for PDSCH(s) (and/or PDCCH(s)) terminated/received before Tref,sr overlaps with an SR PUCCH resource on the time axis, the UE may multiplex an A/N with an SR and transmit the multiplexed A/N and SR. If the A/N PUCCH does not exist or does not overlap with the SR PUCCH on the time axis, the UE may transmit the SR only, which facilitates UE implementation. Further, multiplexing between an A/N and an SR is allowed in most cases, and thus dropping of A/N or SR transmissions may be reduced in [proposed method #1]. Further, [proposed method #1] is advantageous in that even when an A/N and an SR are multiplexed and transmitted on an SR PUCCH (e.g., both of an A/N PUCCH and the SR PUCCH are in F1), a minimum PDSCH-to-HARQ-ACK transmission processing time is guaranteed for A/N transmission, thus offering a unified solution. If a plurality of SR PUCCHs distinguishable from each other are configured in one slot, the UE may determine for an earlier SR PUCCH whether the SR PUCCH can be multiplexed with an A/N, and if the A/N transmission is not to be dropped, determine for the next SR PUCCH whether the SR PUCCH can be multiplexed with the A/N. In this manner, the UE may sequentially perform the foregoing operation.

In a modification to [proposed method #1], if an A/N PUCCH corresponding to PDSCH(s) (and/or PDCCH(s)) of which the transmission has started until Tref,sr (i.e., Tsr–To) overlaps with an SR PUCCH, an A/N may be multiplexed with an SR. Otherwise, only the SR may be transmitted. This operation is based on the assumption that if the starting transmission time of the PDSCH (and/or PDCCH(s)) (corresponding to the A/N PUCCH) is earlier than (or coincides with) Tref,sr, the UE has a sufficient time for detecting and demodulating a PDCCH (e.g., a DL assignment) corresponding to the PDSCH and thus is capable of identifying the presence of the A/N PUCCH colliding with the SR PUCCH before determining to transmit the SR PUCCH. Therefore, If the starting transmission time of the PDSCH (and/or PDCCH(s)) (corresponding to the A/N PUCCH) is later than Tref,sr, the UE does not have a sufficient time for detecting and demodulating the PDCCH (e.g., the DL assignment) corresponding to the PDSCH and thus does not take the PDSCH(s) into account in determining whether to multiplex the A/N and the SR.

In a modification to [proposed method #1], if an A/N PUCCH resource and an SR PUCCH resource which are to be transmitted by the UE overlap with each other (over part of the OFDM symbols of a PUCCH) on the time axis, it may be determined whether to multiplex an A/N and an SR according to a relative relationship between the ending (or starting) transmission time of PDSCH(s) (and/or PDCCH(s)) corresponding to the A/N PUCCH resource and the starting transmission time of an SR PUCCH.

However, if the UE does not multiplex the A/N and the (positive) SR, the UE may drop transmission of one of the A/N and the (positive) SR.

For example, the UE may determine whether to multiplex the A/N and the (positive) SR according to whether the ending (or starting) transmission time of the PDSCH(s) (and/or PDCCH(s)) (corresponding to the A/N PUCCH resource) is earlier/later than Tref,sr (i.e., Tsr–To), in the following manner.

(1) If the ending (or starting) transmission time of the PDSCH(s) (and/or PDCCH(s)) (corresponding to the A/N PUCCH resource) is later than Tref,sr, A. one of the A/N and the (positive) SR is selected and transmitted.

i. If the UCI state of the SR is positive SR, 1. the SR is transmitted in the SR PUCCH resource (the A/N transmission is dropped).

ii. If the UCI state of the SR is negative SR, 1. the A/N is transmitted in the A/N PUCCH resource.

(2) If the ending (or starting) transmission time of the PDSCH(s) (and/or PDCCH(s)) (corresponding to the A/N PUCCH resource) is earlier than (or coincides with Tref,sr, A. the A/N and the (positive) SR are multiplexed and transmitted (or the UCI multiplexing rule applied to the case where an A/N PUCCH and an SR PUCCH fully overlap with each other over all OFDM symbols of a PUCCH is followed).

i. Case in which the A/N PUCCH is in PUCCH format 0.
1. If the UCI state of the SR is positive SR,
the A/N is transmitted in a resource resulting from applying a CS/OCC/PRB offset to the A/N PUCCH.
2. If the UCI state of the SR is negative SR,
the A/N is transmitted in the A/N PUCCH resource.
ii. Case in which the A/N PUCCH is in PUCCH format 1.
1. If the UCI state of the SR is positive SR,
the A/N is transmitted in the SR resource. However, if the SR PUCCH is in PUCCH format 0, only the A/N may be transmitted, while the SR transmission is dropped.
2. If the UCI state of the SR is negative SR,
the A/N is transmitted in the A/N PUCCH resource.
iii. Case in which the A/N PUCCH is in one of PUCCH formats 2, 3 and 4.
1. If the UCI state of the SR is positive SR or negative SR,
UCI payload is generated by representing the SR in explicit bit(s) and appending the SR to the A/N, and then the generated UCI is transmitted in the A/N PUCCH resource.

$T_0$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

In a modification to [proposed method #1], the following operation may be performed for UCI multiplexing between an A/N and CSI, similarly to UCI multiplexing between an A/N and an SR. For example, an A/N PUCCH resource and a CSI PUCCH resource may overlap with each other (over all or part of the OFDM symbols of a PUCCH) on the time axis. In this case, the UE may determine whether to multiplex between an A/N and CSI depending on whether an A/N PUCCH resource corresponding to (or indicated by) PDSCH(s) and/or PDCCH(s)) which has been received (or of which the transmission has started) until a specific time (earlier than a reference time)) overlaps with a CSI PUCCH resource on the time axis.

However, if the UE does not multiplex the A/N with the CSI, the UE may drop transmission of one of the A/N and the CSI.

For example, the UE may determine whether to multiplex the A/N and the CSI depending on whether an A/N PUCCH resource corresponding to (or indicated by) PDSCH(s) and/or PDCCH(s)) which has been received (or of which the transmission has started) until a time Tref,csi earlier than the starting transmission time (e.g., starting symbol) Tcsi of a CSI PUCCH by $T_0$ overlaps with the CSI PUCCH resource on the time axis. Tref,csi may be defined as Tref,csi=Tcsi−$T_0$ and represented in OFDM symbols. Tref,csi may be defined as Tref,csi=Tcsi−$T_0$ and represented in OFDM symbols.

(Case 1) If the A/N PUCCH resource corresponding to (or indicated by) the PDSCH(s) (and/or PDCCH(s)) which has been received (or of which the transmission has started) until Tref,csi overlaps with the CSI PUCCH resource on the time axis, the UE may multiplex the A/N and the CSI and transmit the multiplexed A/N and CSI.

(1) If the A/N PUCCH is indicated by a DL assignment, the A/N and the CSI are multiplexed and transmitted in the A/N PUCCH resource.

(2) If the A/N PUCCH is not indicated by a DL assignment,
the A/N and the CSI are multiplexed and transmitted in the CSI PUCCH resource.

(Case 2) In any other case than (Case 1), the UE may select and transmit one of the A/N and the CSI. For example, (i) if an A/N PUCCH resource corresponding to (or indicated by) PDSCH(s) (and/or PDCCH(s)) which has been received (or of which the transmission has started/ended) after Tref,csi overlaps with the CSI PUCCH resource on the time axis, (ii) if an A/N PUCCH resource corresponding to (indicated by) PDSCH(s) (and/or PDCCH(s)) which has been received (or of which the transmission has started) until Tref,csi does not overlap with the CSI PUCCH resource on the time axis, or (iii) if there is no A/N PUCCH resource corresponding to (or indicated) by the PDSCH(s) and/or PDCCH(s)) which has been received (or of which the transmission has started) until Tref,csi, the UE may select and transmit one of the A/N and the CSI.

(1) Opt. 1: The CSI is transmitted in the CSI PUCCH resource (the A/N transmission is dropped).

(2) Opt. 2: The A/N is transmitted in the A/N PUCCH resource (the CSI transmission is dropped).

$T_0$ may be one of the following values. $T_0$ may be represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

[Proposed method #1A] If PUCCH resources for transmission configured for/indicated to the UE overlap with each other over all or part of OFDM symbols on the time axis in a slot, the UE performs UCI multiplexing according to the following UCI multiplexing rule.

(1) If the overlapped PUCCH resources in the slot satisfy all or part of the following conditions, the UE multiplexes and transmits UCIs for the overlapped PUCCH resources in a single PUCCH resource (hereinafter, referred to as MUX PUCCH).

A. Condition #1
i. Opt. 1: On the assumption that the UCIs for the overlapped PUCCH resources in the slot are multiplexed (if there is a PUCCH resource for HARQ-ACK transmission in the overlapped PUCCH resources in the slot), the first (OFDM) symbol of the (single) PUCCH resource to carry the multiplexed UCI starts after $T_1$ from the last (OFDM) symbol of (each of) PDSCH(s) corresponding to an HARQ-ACK and/or SPS PDSCH release(s).

ii. Opt. 2: (If there is a PUCCH resource for HARQ-ACK transmission in the overlapped PUCCH resources in the slot), the first (OFDM) symbol of the slot (or the first (OFDM) symbol allowed for UL transmission in the slot) starts after $T_1$ from the last (OFDM) symbol of (each of) PDSCH(s) corresponding to an HARQ-ACK (or SPS PDSCH release(s)).

iii. Opt. 3: On the assumption that the UCIs for the overlapped PUCCH resources in the slot are multiplexed (if there is a PUCCH resource for HARQ-ACK transmission in the overlapped PUCCH resources in the slot), the first (OFDM) symbol of the (time-axis) earliest of the (single) PUCCH resource to carry the multiplexed UCI and the overlapped PUCCH resources in the slot starts after $T_1$ from the last (OFDM) symbol of (each of) PDSCH(s) corresponding to an HARQ-ACK (or the SPS PDSCH release(s)).

iv. Opt. 4: On the assumption that the UCIs for the overlapped PUCCH resources in the slot are multiplexed (if there is a PUCCH resource for HARQ-ACK transmission in the overlapped PUCCH resources in the slot), the first (OFDM) symbol of the (time-axis) earliest of the (single) PUCCH resource to carry the multiplexed UCI and overlapped CSI resource(s) in the slot starts after $T_1$ from the last (OFDM) symbol of (each of) PDSCH(s) corresponding to an HARQ-ACK (or the SPS PDSCH release(s)).

v. Opt. 5: (If there is a PUCCH resource for HARQ-ACK transmission in the overlapped PUCCH resources in the slot), the first (OFDM) symbol of the (time-axis) earliest of (all) PUCCH resource(s) for any UCI combination/UCI payload in the slot, configured for the UE starts after $T_1$ from the last (OFDM) symbol of (each of) PDSCH(s) corresponding to an HARQ-ACK (or SPS PDSCH release(s)).

B. Condition #2 i. Opt. 1: On the assumption that the UCIs for the overlapped PUCCH resources in the slot are multiplexed (if there is a PUCCH resource for transmission, indicated by DCI among the overlapped PUCCH resources in the slot), the first (OFDM) symbol of the (time-axis) earliest of a (single) PUCCH resource selected according to a specific rule and the overlapped PUCCH resources in the slot starts after $T_2$ from the last (OFDM) symbol of the (scheduling) DCI.

ii. Opt. 2: (If there is a PUCCH resource for transmission, indicated by DCI among the overlapped PUCCH resources in the slot,) the first (OFDM) symbol of the (time-axis) earliest of the overlapped PUCCH resources in the slot starts after $T_2$ from the last (OFDM) symbol of the (scheduling) DCI.

iii. Opt. 3: (If there is a PUCCH resource for transmission, indicated by DCI among the overlapped PUCCH resources in the slot,) the first (OFDM) symbol of the (time-axis) earliest of (all) PUCCH resource(s) for any UCI combination/UCI payload in the slot, configured for the UE starts after $T_2$ from the last (OFDM) symbol of the (scheduling) DCI.

iv. Opt. 4: (If there is a PUCCH resource for transmission, indicated by DCI among the overlapped PUCCH resources in the slot,) the first (OFDM) symbol of the slot (or the first (OFDM) symbol allowed for UL transmission in the slot) starts after $T_2$ from the last (OFDM) symbol of the (scheduling) DCI.

Herein, a (scheduling) DCI-based PUCCH resource may be a PUCCH resource carrying an HARQ-ACK, allocated by DCI. The last symbol of DCI may be the last symbol in which a PDCCH carrying the DCI is transmitted.

(2) If (part of) the overlapped PUCCH resources in the slot do not satisfy the above condition(s), the UE may perform the following operations.

A. Opt. 1: The UE does not expect the case of (2). If the case of (2) occurs, the UE operates according to UE implementation.

B. Opt. 2: The UE multiplexes UCI(s) for the remaining PUCCH resource(s) satisfying the condition(s) in (1) and transmits the multiplexed UCI in a single PUCCH resource, while dropping transmission of UCI(s) for (some) PUCCH resource(s) failing to satisfy the condition(s) in (1).

C. Opt. 3: The UE drops transmission of the PUCCH resource(s) in the slot.

D. Opt. 4: The UE transmits only a specific (one) PUCCH resource (among the overlapped PUCCH resources in the slot) (e.g., a PUCCH resource carrying UCI of a highest priority or an earliest PUCCH resource on the time axis), while dropping transmission of the other PUCCH resources.

However, on the assumption that UCIs for overlapped PUCCH resources (of which the transmission is indicated by higher-layer signaling (e.g., RRC signaling) and/or DCI) in a slot are multiplexed, a new (single) PUCCH resource (MUX PUCCH) to carry the multiplexed UCI may be determined according to a specific rule which is set based on a UCI combination (to be multiplexed), a (total) UCI payload size, and so on.

$T_1$ may be a value corresponding to a UE processing time required to transmit an HARQ-ACK after the UE receives a PDSCH. Further, $T_2$ is a value corresponding to a UE processing time required to perform UL transmission after the UE receives (scheduling) DCI. $T_1$ and $T_2$ may be represented in (OFDM) symbols.

When the UE determines whether to multiplex UCIs between PUCCH resources overlapped on the time axis, the UE may consider at least two timeline conditions. Timeline condition #1 is intended to ensure a UE processing time from PDSCH reception until HARQ-ACK transmission. Timeline condition #1 aims to allow transmission of an HARQ-ACK after a predetermined time $T_1$ from the last (OFDM) symbol of PDSCH(s) corresponding to the HARQ-ACK. Therefore, the condition based on $T_1$ should be applied based on a UL resource carrying the HARQ-ACK. If overlapped UCIs are multiplexed, the condition based on $T_1$ may be applied between the starting time of a PUCCH resource determined (according to a specific rule) and the last (OFDM) symbol of PDSCH(s) corresponding to an HARQ-ACK. Timeline condition #2 is intended to ensure a UE processing time from PDCCH reception until UL transmission. Timeline condition #2 aims to allow UL transmission after $T_2$ from the last (OFDM) symbol of PDCCH(s) (which schedules the UL transmission on one or more of the overlapped PUCCH(s)). Timeline condition #2 also aims to indicate whether any UL transmission is scheduled before $T_2$ from the start of the UL transmission. Therefore, the PDCCH(s) (which schedules the UL transmission on one or more of the overlapped PUCCH(s)) should be completely received before $T_2$ from the earliest UL resource among the overlapped PUCCH resource(s). That is, timeline condition #2 may be a condition for starting the first (OFDM) symbol of the (time-domain) earliest of the overlapped PUCCH resources in the slot (and a (single) PUCCH resource selected according to a specific rule on the assumption that UCIs are multiplexed) after $T_2$ from the last (OFDM) symbol of (scheduling) DCI.

[Proposed method #1B] If PUCCH resource(s) and PUSCH resource(s) configured for/indicated to a UE overlap with each other over all or part of OFDM symbols on the time axis in a slot, the UE performs UCI multiplexing according to the following UCI multiplexing rule.

(1) If the PUCCH resource(s) and PUSCH resource(s) overlapped in the slot satisfy all or part of the following conditions, the UE multiplexes UCI(s) and UL-SCH TB(s) for the overlapped PUCCH resource(s) and PUSCH resource(s) and transmits the multiplexed UCI and UL-SCH in a single PUSCH resource (hereinafter, referred to as MUX PUSCH).

A. Condition #1
    i. Opt. 1: if UCI(s) for the overlapped PUCCH resource(s) in the slot is multiplexed (if there is a PUCCH resource for HARQ-ACK transmission among the overlapped PUCCH resource(s) in the slot,) the first (OFDM) symbol of a (single) PUSCH resource to carry the multiplexed UCI starts after $T_1$ from the last (OFDM) symbol of (each of) PDSCH(s) for an HARQ-ACK and/or SPS PDSCH release(s).
    ii. Opt. 2: (If there is a PUCCH resource for HARQ-ACK transmission among the overlapped PUCCH resource(s) in the slot,) the first (OFDM) symbol of the slot (or the first (OFDM) symbol allowed for UL transmission in the slot) of the slot starts after $T_1$ from the last (OFDM) symbol of (each of) PDSCH(s) corresponding to an HARQ-ACK (or SPS PDSCH release(s)).
    iii. Opt. 3: (If there is a PUCCH resource for HARQ-ACK transmission among the overlapped PUCCH resource(s) in the slot,) the first (OFDM) symbol of the (time-axis) earliest of the overlapped PUCCH resource(s) and PUSCH resource(s) in the slot starts after $T_1$ from the last (OFDM) symbol of (each of) PDSCH(s) corresponding to an HARQ-ACK (or SPS PDSCH release(s)).
    iv. Opt. 4: (Ife there is a PUCCH resource for HARQ-ACK transmission among the overlapped PUCCH resource(s) in the slot,) the first (OFDM) symbol of the (time-axis) earliest UL transmission resource of (all) PUCCH resource(s) configured for any UCI combination/UCI payload for the UE in the slot and (all) PUSCH resource(s) in the slot starts after $T_1$ from the last (OFDM) symbol of (each of) PDSCH(s) corresponding to an HARQ-ACK (or SPS PDSCH release(s)).
  B. Condition #2
    i. Opt. 1: (If there is a PUCCH resource for transmission, indicated by DCI, among the overlapped PUCCH resource(s) in the slot,) the first (OFDM) symbol of the (time-axis) earliest UL transmission resource among the overlapped PUCCH resource(s) and PUSCH resource(s) in the slot starts after $T_2$ from the last (OFDM) symbol of the (scheduling) DCI.
    ii. Opt. 2: (If there is a PUCCH resource for transmission, indicated by DCI, among the overlapped PUCCH resource(s) in the slot,) the first (OFDM) symbol of the (time-axis) earliest UL transmission resource among (all) PUCCH resource(s) and (all) PUSCH resource(s) configured for any UCI combination/UCI payload in the slot, for the UE starts after $T_2$ from the last (OFDM) symbol of the (scheduling) DCI.
    iii. Opt. 3: (If there is a PUCCH resource for transmission, indicated by DCI, among the overlapped PUCCH resource(s) in the slot,) the first (OFDM) symbol of the slot (or the first (OFDM) symbol allowed for UL transmission in the slot) starts after $T_2$ from the last (OFDM) symbol of the (scheduling) DCI.

Herein, a (scheduling) DCI-based PUCCH resource may be a PUCCH resource carrying an HARQ-ACK, allocated by DCI. The last symbol of DCI may be the last symbol in which a PDCCH carrying the DCI is transmitted.

(2) If (part of) the overlapped PUCCH resource(s) and/or (part) of PUSCH resource(s) in the slot do not satisfy the above condition(s), the UE may perform the following operations.

A. Opt. 1: The UE does not expect the case of (2). If the case of (2) occurs, the UE operates according to UE implementation.
  B. Opt. 2: The UE drops transmission of UCI(s) corresponding to (part) of the PUCCH resource(s) and/or transmission of a UL-SCH TB corresponding to (part) of the PUSCH resource(s), which do not satisfy the condition(s) of (1). On the other hand, the UE multiplexes UCI(s) and/or UL-SCH(s) for the remaining PUCCH resource(s) and/or the remaining PUSCH resource(s), which satisfy the condition(s) of (1), and transmits the multiplexed UCI and UL-SCH in a single PUCCH resource, or a single PUSCH resource (if there is any overlapped PUSCH resource satisfying the condition(s) of (1)).
  C. Opt. 3: Transmission of the overlapped PUCCH resource(s) and/or PUSCH resource(s) in the slot is dropped.
  D. Opt. 4: Only a specific (one) PUCCH or PUSCH resource (e.g., a UL resource carrying UCI of a highest priority or an earliest UL resource on the time axis) (among the overlapped PUCCH resource(s) and/or PUSCH resource(s) in the slot) is transmitted, while transmission of the other PUCCH or PUSCH resources is dropped.

However, on the assumption that UCI(s) for overlapped PUCCH resource(s) (of which the transmission is indicated by higher-layer signaling (e.g., RRC signaling) and/or DCI) in a slot is multiplexed, a new (single) PUCCH resource (MUX PUCCH) to carry the multiplexed UCI may be determined according to a specific rule determined based on a UCI combination (to be multiplexed), a (total) UCI payload size, and so on.

$T_1$ may be a value corresponding to a UE processing time required to transmit an HARQ-ACK after the UE receives a PDSCH. Further, $T_2$ is a value corresponding to a UE processing time required to perform UL transmission after the UE receives (scheduling) DCI. $T_1$ and $T_2$ may be represented in (OFDM) symbols.

When the UE determines whether to multiplex UCI between PUCCH resource(s) and PUSCH resource(s) overlapped on the time axis, the UE may consider at least two timeline conditions. Timeline condition #1 is intended to ensure a UE processing time from PDSCH reception until HARQ-ACK transmission. Timeline condition #1 aims to allow transmission of an HARQ-ACK after a predetermined time $T_1$ from the last (OFDM) symbol of PDSCH(s) corresponding to the HARQ-ACK. Therefore, the condition based on $T_1$ should be applied based on a UL resource carrying the HARQ-ACK. If overlapped UCIs are multiplexed, the condition based on $T_1$ may be applied between the starting time of a PUCCH resource or PUSCH resource determined (according to a specific rule) and the last (OFDM) symbol of PDSCH(s) corresponding to the HARQ-ACK. Timeline condition #2 is intended to ensure a UE processing time from PDCCH reception until UL transmission. Timeline condition #2 aims to allow UL transmission after a predetermined time $T_2$ from the last (OFDM) symbol of PDCCH(s) (which schedules UL transmission on one or more of the overlapped PUCCH(s)). Timeline condition #2 also aims to indicate whether any UL transmission is scheduled before $T_2$ from the start of the UL transmission. Therefore, the PDCCH(s) (which schedules UL transmission on one or more of the overlapped PUCCH(s)) should be completely received before $T_2$ from the earliest UL resource among the overlapped PUCCH resource(s). That is, timeline condition #2 may be a condition for starting the first (OFDM) symbol of the (time-axis) earliest of the overlapped PUCCH resources and PUSCH resource(s) in the slot after $T_2$ from the last (OFDM) symbol of the (scheduling) DCI.

[Proposed method #1D] If a (single) SR PUCCH resource in a slot, (semi-statically) configured for/indicated to the UE overlaps with two or more (semi-statically configured) CSI PUCCHs on the time axis, the UE performs one of the following operations.

(1) Opt. 1: CSI and an SR are multiplexed and transmitted by adding all of SR bit(s) to the UCI payload of each CSI PUCCH resource. That is, SR information may be loaded on all CSI PUCCHs overlapped with the SR PUCCH.

SR information(s) loaded in a plurality of CSI PUCCH resources may be a copy of SR information transmitted in the first CSI PUCCH resource. That is, the SR information loaded on the plurality of CSI PUCCH resources may be the same duplicates. Further, the SR information loaded on the plurality of CSI PUCCH resources may be SR information updated for each CSI PUCCH resource (or, reflecting the SR state of the UE (e.g., negative or positive) at each CSI PUCCH time). That is, the SR information loaded on the plurality of CSI PUCCH resources may be SR information updated at each transmission time of a CSI PUCCH resource.

(2) Opt. 2: The CSI and the SR are multiplexed and transmitted by adding the SR bit(s) only to the UCI payload of a specific single CSI PUCCH resource. The specific single CSI PUCCH resource may be one of the followings.

Opt. 2-1: The first (or last) CSI PUCCH resource on the time axis or a CSI PUCCH resource having the earliest (or latest) starting time. That is, the SR information may be loaded only on the first of all CSI PUCCHs overlapped with the SR PUCCH.

Opt. 2-2: A CSI PUCCH resource having a largest transmission capacity.

Opt. 2-3: A CSI PUCCH resource configured for CSI having a highest priority.

In the NR system, in the case where a single CSI PUCCH resource overlaps with one or more SR PUCCH resource in one slot, an operation of multiplexing all UCIs and transmitting the multiplexed UCI in a single CSI PUCCH resource is under consideration. Regarding multiplexing between CSI and an SR, a UCI multiplexing rule should also be set for the case where a single SR PUCCH resource overlaps with a plurality of CSI PUCCH resources, unlike the above case. The foregoing proposed options may be considered in regard to the issue.

[Proposed method #1E] If a (single) AN PUCCH resource in a slot, configured for/indicated to the UE overlaps with two or more (semi-statically configured) CSI PUCCHs on the time axis, the UE performs one of the following operations.

(1) Case in which the AN PUCCH resource is scheduled based on DCI.

A. Opt. 1: A CSI report for a specific one of the CSI PUCCH resource(s) overlapped with the AN PUCCH resource may be multiplexed with an HARQ-ACK and transmitted in a (single) PUCCH resource. For example, the specific one CSI PUCCH resource includes a CSI PUCCH resource which is earliest on the time axis or configured/corresponding for/to CSI of a highest priority.

i. The (single) PUCCH resource carrying the multiplexed UCI may be selected from among PUCCH resources configured for HARQ-ACK transmission (based on DCI and a total UCI payload size). For example, a PUCCH resource may be selected based on DCI and a total UCI payload size as follows. The UE may first select one of the following PUCCH resource sets according to the total number of UCI payload bits, $N_{UCI}$.

PUCCH resource set #0, if the number of UCI bits≤2
PUCCH resource set #1, if 2<the number of UCI bits≤$N_1$
. . .
PUCCH resource set #(K−1), if $N_{K-2}$<the number of UCI bits≤$N_{K-1}$ K represents the number of PUCCH resource sets (K>1) and $N_i$ represents a maximum number of UCI bits supported by PUCCH resource set # i. For example, PUCCH resource set #1 may include resources of PUCCH format 0 to PUCCH format 1, and the other PUCCH resource sets may include resources of PUCCH format 2 to PUCCH format 4 (see Table 5). A PUCCH resource of the selected PUCCH resource set, to be used for UCI transmission may be indicated by an ARI in the DCI.

ii. Transmissions of the other CSI PUCCHs than the specific CSI PUCCH and CSI reports corresponding to the other CSI PUCCHs may be skipped.

B. Opt. 2: All of CSI report(s) for the CSI PUCCH resource(s) overlapped with the AN PUCCH resource or only up to M high-priority ones of the CSI report(s) according to a predefined/preconfigured priority rule may be multiplexed with an HARQ-ACK and transmitted in a (single) PUCCH resource.

i. M may be 1 or 2.

ii. M may be a pre-agreed value or a value configured/defined based on a higher-layer signal.

iii. The (single) PUCCH resource carrying the multiplexed UCI may be selected from among PUCCH resources configured for HARQ-ACK transmission (based on DCI and a total UCI payload size).

(2) Case in which an AN PUCCH resource is semi-statically configured (i.e., the AN PUCCH resource is not scheduled based on DCI) (e.g., an AN for a SPS PDSCH).

A. Opt. 1: An HARQ-ACK and a CSI report are multiplexed for each of CSI PUCCH resources overlapped with the AN PUCCH resource, and transmitted in the CSI PUCCH resource.

B. Opt. 2: An HARQ-ACK and a CSI report are multiplexed for a specific one of the CSI PUCCH resources overlapped with the AN PUCCH resource and transmitted in the specific CSI PUCCH resource. For example, the specific one CSI PUCCH resource includes a PUCCH resource which is earliest on the time axis or is configured for CSI of a highest priority.

Herein, an AN PUCCH resource refers to a PUCCH resource for HARQ-ACK transmission.

Herein, a CSI PUCCH resource refers to a PUCCH resource for CSI transmission.

Because the NR system supports a flexible PUCCH transmission period configuration, a single AN PUCCH resource and one or more CSI PUCCH resources may overlap with each other in one slot. If the AN PUCCH resource is scheduled based on DCI, UCI in which an HARQ-ACK is multiplexed with CSI may be transmitted in a PUCCH resource selected from among PUCCH resources configured for HARQ-ACK transmission. In this case, because a relatively large UCI payload size range is supported, an operation of multiplexing and transmitting an HARQ and a plurality of CSI reports for a predetermined plural number of CSI PUCCH resources (of high priority) based on a priority rule may be supported. The maximum number of CSI reports allowed to be multiplexed with an HARQ-ACK may be limited by higher-layer signaling (RRC signaling). Alternatively, a simple method of multiplexing and transmitting an HARQ-ACK and only a CSI report for the first one of CSI PUCCH resources overlapped with an AN PUCCH resource on the time axis may be considered. If an AN PUCCH resource (e.g., for a SPS PDSCH) is semi-statically configured by higher-layer signaling (RRC signaling), UCI in which an HARQ-ACK is multiplexed with CSI may be transmitted in a CSI PUCCH resource. In this case, for each of the CSI PUCCH resource(s) overlapped with the AN PUCCH resource, an HARQ-ACK and CSI are multiplexed and transmitted in the CSI PUCCH resource (i.e., repeated transmissions from the viewpoint of the HARQ-ACK). Alternatively, for the first of the CSI PUCCH resource(s) overlapped with the AN PUCCH resource, an HARQ-ACK and CSI are multiplexed and transmitted in the first CSI PUCCH resource.

[Proposed method #1F] If a (single) PUSCH resource configured for/indicated to a UE overlaps with two or more CSI PUCCH resources (or AN PUCCH resources) on the time axis in a slot, the UE performs one of the following operations.

(1) Opt. 1: A CSI report (or HARQ-ACK information) for a specific one CSI PUCCH resource (or AN PUCCH resource) among CSI PUCCH resource(s) (or AN PUCCH resource(s)) overlapped with a PUSCH is multiplexed with a UL-SCH TB (e.g., UL data) and transmitted in a PUSCH resource (e.g., UCI piggyback).

The specific single CSI PUCCH resource may include a CSI PUCCH resource configured for CSI which is earliest on the time axis or has a highest priority. Further, the specific single CSI PUCCH resource may include an earliest An PUCCH resource on the time axis.

Transmission of the remaining CSI PUCCHs (or AN PUCCHs) other than the specific single CSI PUCCH resource (or AN PUCCH resource) and a corresponding CSI report (or HARQ-ACK) may be dropped.

(2) Opt. 2: All of CSI report(s) (or HARQ-ACK information) for CSI PUCCH resource(s) (or AN PUCCH resource(s)) overlapped with a PUSCH is multiplexed with a UL-SCH TB (e.g., UL data) and transmitted in the PUSCH resource (e.g., UCI piggyback). Alternatively, up to M CSI reports with higher priorities selected from among the CSI report(s) (or HARQ-ACK information) for the CSI PUCCH resource(s) (or AN PUCCH resource(s)) overlapped with the PUSCH in a predefined/preconfigured priority rule are multiplexed with the UL-SCH TB (e.g., UL data) and transmitted in the PUSCH resource (e.g., UCI piggyback).

M may be 1 or 2.

M may be preset or configured/defined by higher-layer signaling (or RRC signaling).

If a PUSCH resource is replaced with a CSI PUCCH resource and a UL-SCH TB is replaced with CSI in [proposed method #1F], a CSI multiplexing operation for a CSI PUCCH resource and an AN PUCCH resource may be performed in the same manner.

Since the NR system supports a flexible PUCCH transmission period configuration, it may occur that a single PUSCH resource overlaps with one or more CSI PUCCH resources (or AN PUCCH resources) in one slot. In this case, only M CSI report(s) for M (higher-priority) CSI PUCCH resource(s) based on a priority rule may be UCI-piggybacked to the PUSCH. M may be preset or configured/defined by higher-layer signaling (or RRC signaling). Or simply, only a CSI report (or HARQ-ACK) for the first CSI PUCCH resource (or AN PUCCH resource) overlapped with the PUSCH resource on the time axis may be UCI-piggybacked to the PUSCH.

[Proposed method #1G] An operation of limiting the number of (TDMed) PUCCH transmissions in a slot is under consideration in the NR system. Accordingly, there is a need for defining a UE operation, when a plurality of PUCCH transmissions in one slot are indicated/configured.

For example, when a UE is allowed to transmit up to M (e.g., M=2) (TDMed) PUCCH resource(s) in one slot, transmission of N (N>M) (TDMed) (non-overlapped) PUCCH resource(s) in a specific slot may be configured for and/or indicated to the UE. The N (TDMed) PUCCH resource(s) refers to/includes PUCCH resource(s) which are not overlapped on the time axis. In this case, the UE may transmit M or fewer (TDMed) PUCCH resource(s) in the slot in one of the following methods. Herein, transmission of a PUCCH resource may mean/include transmission of UCI in the PUCCH resource.

(1) Method #1: M or fewer (TDMed) high-priority PUCCH resource(s) in the slot are selected according to priority rule(s) and transmitted.

A. One or more of the following priority rules may be applied.

i. Priority rule #1: prioritization based on scheduling methods.

PUCCH resource indicated for UCI transmission by DCI (e.g., PUCCH resource indicated by an ARI)>PUCCH resource configured by higher-layer signaling (e.g., RRC signaling) (e.g., AN PUCCH resource for a SPS PDSCH, PUCCH resource for periodic CSI reporting, and so on).

ii. Priority rule #2: prioritization based on PUCCH formats.

Short PUCCH (e.g., PUCCH format 0/2)>Long PUCCH (e.g., PUCCH format 1/3/4)

iii. Priority rule #3: prioritization based on UCI types.

PUCCH resource carrying HARQ-ACK>PUCCH resource carrying SR (without HARQ-ACK)>PUCCH resource carrying CSI (without HARQ-ACK/SR)

One thing to note herein is that in the presence of a plurality of (TDMed) PUCCH resources for the same UCI type, a PUCCH resource corresponding to a report of a high priority according to a (pre-agreed) priority rule for a plurality of reports for the same UCI type may have a high priority (from the viewpoint of selection of M PUCCH resources). That is, in the presence of a plurality of PUCCH resources corresponding to a plurality of UCIs (e.g., CSIs) of the same type, the priority of each PUCCH resource is based on the priority of corresponding UCI.

The priorities of CSI reports may be determined based on at least one of the types of the CSI reports (e.g., aperiodic CSI report, semi-static CSI report, and periodic CSI report), physical channels carrying the CSI reports, the contents (e.g., Layer-1 received signal received powers (L1-RSRPs)) of the CSI reports, the indexes of cells related to the CSI reports, IDs related to the CSI reports, or the maximum number of CSI report configurations. For example, the priority levels of CSI reports in an NR system publicized before the priority date of the present disclosure are defined as follows (3GPP 38.214 Rel-15.1.0, 5.2.5 "Priority rules for CSI reports"; 2018-03).

$$Pri_{CSI}(y,k,c,s) = 2*16*M_s*y + 16*M_s*k + M_s*c + s \quad \text{[Equation 1]}$$

For transmission of an aperiodic CSI report on a PUSCH, y=0, for transmission of a semi-static CSI report on a PUSCH, y=1, for a semi-static CSI report on a PUCCH, y=2, and for transmission of a periodic CSI report on a PUCCH, y=4.

For a CSI report carrying an L1-RSRP, k=0, and for a CSI report that does not carry an L1-RSRP, k=1.

c represents the index of a serving cell.

s represents an ID (e.g., ReportConfigID) related to a CSI report configuration.

Ms is the maximum number of CSI report configurations configured by higher-layer signaling.

As the value of $Pri_{CSI}(y,k,c,s)$ is smaller, the priority is higher.

Iv. Priority rule #4: prioritization based on transmission order.

PUCCH resource earlier in transmission order on the time axis>PUCCH resource later in transmission order on the time axis (with respect to a starting or ending OFDM symbol).

In the above priority rules, the left of the inequality sign represents a higher priority.

When M (TDMed) PUCCHs are transmitted in one slot, at least one PUCCH resource may be in PUCCH format Y. PUCCH format Y includes a PUCCH resource of a short symbol duration (e.g., one or two symbols). For example, PUCCH format Y may include PUCCH format 0/2 (or Short PUCCH). On the other hand, PUCCH format X includes a PUCCH resource of a long symbol duration (e.g., 4 to 14 symbols). For example, PUCCH format X may include PUCCH format 1/3/4 (or Short PUCCH).

When M (TDMed) PUCCHs are transmitted in one slot, at least one PUCCH resource (e.g., S PUCCH resources) is in PUCCH format Y. Therefore, the number of PUCCH resources of PUCCH format X allowed to be transmitted in one slot may be limited to L (<M) at maximum (e.g., L=M-S). Accordingly, when the number of PUCCH resources of PUCCH format X has reached L during priority rule(s)-based PUCCH resource(s) selection, the UE may perform a PUCCH resource selection procedure according to priority rule(s) for the remaining PUCCH resource(s) except for the PUCCH resource(s) of PUCCH format X in order to select a PUCCH resource of the next priority. On the contrary, when the number of PUCCH resources of PUCCH format X has not reached L, the UE may perform the PUCCH resource selection procedure according to the priority rule(s) for the remaining PUCCH resource(s) including PUCCH resource(s) of PUCCH format X in order to select a PUCCH resource of the next priority. If M=2, S=1 and L=1.

For example, transmission of only two high-priority PUCCH resources among (TDMed) PUCCH resources in a slot may be allowed (i.e., M=2). If the PUCCH format of the highest-priority PUCCH resource is Long PUCCH (e.g., PUCCH format 1/3/4), the second highest-priority PUCCH resource may be selected only from among the remaining PUCCH resource(s) (i.e., Short PUCCH resource(s)) (e.g., PUCCH format 0/2) except for Long PUCCH resources. If the PUCCH format of the highest-priority PUCCH resource is Short PUCCH (e.g., PUCCH format 0/2), the second highest-priority PUCCH resource may be selected from among the remaining PUCCH resource(s) including Long PUCCH resources. Therefore, a PUCCH resource set from which the second highest-priority PUCCH resource is selected may be different according to the PUCCH format of the highest-priority PUCCH resource. If the PUCCH format of the highest-priority PUCCH resource is Long PUCCH and the PUCCH formats of all of the remaining PUCCH resource(s) except for the highest-priority PUCCH resource are Long PUCCH, the UE may transmit only the highest-priority PUCCH resource in the slot.

In a specific example, there are an AN PUCCH resource of PUCCH format 1, a CSI PUCCH resource of PUCCH format 2, and an SR PUCCH resource of PUCCH format 1 in one slot. According to a priority rule, the AN PUCCH resource may be selected as a highest-priority PUCCH resource. Because only up to one Long PUCCH format (=PUCCH format 1/3/4) is allowed in one slot, the CSI PUCCH resource of PUCCH format 2 (Short PUCCH) may be selected as the second highest-priority PUCCH resource. If the AN PUCCH resource is in a Short PUCCH format in the above example, the second highest-priority PUCCH resource may be either of Long PUCCH or Short PUCCH. Accordingly, the SR PUCCH resource of PUCCH format 1 (Long PUCCH) may be selected as the second highest-priority PUCCH resource.

In another specific example, there are a CSI #1 PUCCH resource of PUCCH format 1, a CSI #2 PUCCH resource of PUCCH format 2, and a CSI #3 PUCCH resource of PUCCH format 1 in one slot. It is assumed that the priorities of CSI reports are in the order of CSI #1>CSI #3>CSI #2. According to the priority rule, the CSI #1 PUCCH resource may be selected as the highest-priority PUCCH resource. Because only up to one Long PUCCH format (=PUCCH format 1/3/4) is allowed in one slot, the CSI #2 PUCCH resource of PUCCH format 2 (Short PUCCH) may be selected as the second highest-priority PUCCH resource. If the CSI #1 PUCCH resource is in a Short PUCCH format in the above example, the second highest-priority PUCCH resource may be either of Long PUCCH or Short PUCCH. Accordingly, the CSI #3 PUCCH resource of PUCCH format 1 (Long PUCCH) may be selected as the second highest-priority PUCCH resource.

Figure 12:
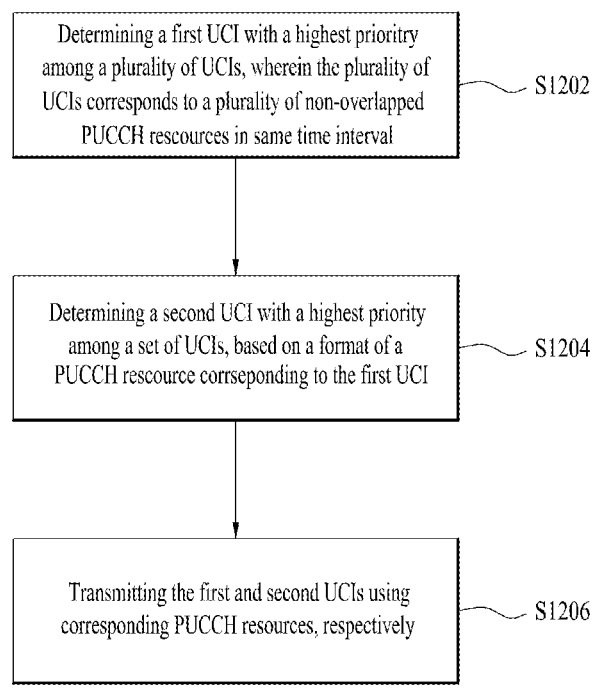
Figure 13:
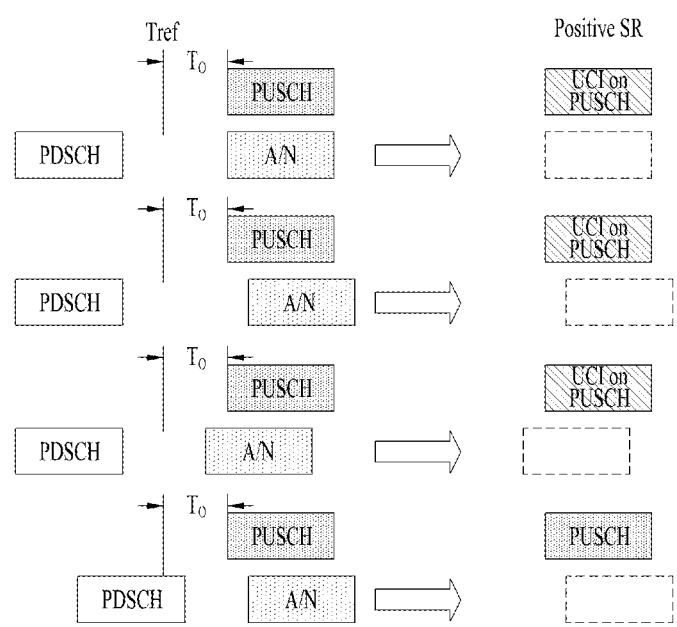

FIG. 12 illustrates an exemplary procedure of transmitting control information according to "priority rule #3: prioritization based on UCI types" in Method #1. The example of FIG. 12 is based on the assumption that transmission of only two high-priority PUCCH resources among (TDMed) PUCCH resources in a slot is allowed.

Referring to FIG. 12, a UE (or an eNB) may determine first UCI of a highest priority from among a plurality of UCIs, wherein the plurality of UCIs may correspond to a plurality of non-overlapped resources in the same time duration (S1202). Each of the UCIs corresponds to a PUCCH resource, and the priorities of PUCCH resources are based on the priorities of their corresponding UCIs. Subsequently, the UE (or the eNB) may determine second UCI of a highest priority in a UCI set, based on the format of a PUCCH resource corresponding of the first UCI (S1204). The UE may then transmit the first UCI and the second UCI in their corresponding PUCCH resources (S1206), and the eNB may receive the first UCI and the second UCI in the corresponding PUCCH resources.

When the PUCCH resource corresponding to the first UCI is in a first format, the UCI set may include all of the remaining UCIs except for the first UCI among the plurality of UCIs. On the other hand, when the PUCCH resource corresponding to the first UCI is in a second format, the UCI set may include only one or more UCIs corresponding to PUCCH resources of the first format among the remaining UCIs except for the first UCI among the plurality of UCIs. That is, the UCI set may include only the remaining UCIs except for UCI(s) corresponding to PUCCH resources of the second format, among the remaining UCIs except for the first UCI among the plurality of UCIs.

A PUCCH resource of the first format may have a shorter duration than a predetermined value (Short PUCCH). For example, the PUCCH resource of the first format may last for one to two symbol duration. For example, the first format includes PUCCH format 0/2. In contrast, a PUCCH resource of the second format may have a longer duration than the predetermined value (Long PUCCH). For example, the PUCCH resource of the second format may last for four or more (e.g., 4 to 14) symbol duration. For example, the first format includes PUCCH format 1/3/4. Herein, a symbol may be an OFDM-based symbol such as a CP-OFDM or DFT-s-OFDM symbol.

Further, the plurality of UCIs may be of the same UCI type. The same UCI type may be A/N, CSI, or SR.

Further, when the PUCCH resource corresponding to the first UCI is Long PUCCH and all of PUCCH resource(s) corresponding to the remaining UCI(s) except for the first UCI among the plurality of UCIs are Long PUCCH, only the first UCI may be transmitted in the corresponding slot.

Further, the communication device may be a device used for a self-driving vehicle.

(2) Method #2: M or fewer (TDMed) PUCCH resource(s) are transmitted in a slot by multiplexing UCI(s) for a part of N (TDMed) PUCCH resource(s) and transmitting the multiplexed UCI in a single PUCCH resource.

A. For example, M high-priority (TDMed) PUCCH resource(s) in the slot may be selected according to priority rule(s) (see Method #1). Subsequently, UCI(s) for the remaining PUCCH resource(s) may be multiplexed and transmitted on the assumption of overlap with the last of the selected M (TDMed) PUCCH resource(s).

[Proposed method #1H] When the UE performs UCI multiplexing for an AN PUCCH resource (for an AN of 2 or fewer bits) and N (e.g., N>1) SR PUCCH resources, a method of scheduling an AN PUCCH and/or a method of differentiating a PUCCH format to carry multiplexed UCI (e.g., AN/SR) according to the number K of PUCCH resource sets configured for an AN PUCCH are given as follows.

(1) Case in which the AN PUCCH resource is indicated by DCI (e.g., ARI),
  A. If K>1,
    the multiplexed UCI (e.g., AN/SR) is transmitted in one of PUCCH formats 2, 3 and 4.
  B. If K=1,
    the multiplexed UCI (e.g., AN/SR) is transmitted in one of PUCCH formats 0 and 1.
(2) Case in which the AN PUCCH resource is not indicated by DCI (e.g., ARI) (e.g., the AN PUCCH resource is associated with A/N information for an SPS PDSCH),
  A. If K>1,
    Opt. 1: the multiplexed UCI (e.g., AN/SR) is transmitted in one of PUCCH formats 0 and 1.
    Opt. 2: the multiplexed UCI (e.g., AN/SR) is transmitted in one of PUCCH formats 2, 3 and 4, selected on the assumption of a specific ARI value.
  B. If K=1,
    the multiplexed UCI (e.g., AN/SR) is transmitted in one of PUCCH formats 0 and 1.

According to the foregoing method, when an AN PUCCH resource overlaps with N (N>1) SR PUCCH resources, the UE may multiple an AN with an SR.

The UE may select a PUCCH resource set according to a (total) UCI payload size, and then transmit UCI (e.g., HARQ-ACK) in a PUCCH resource indicated by an ARI among PUCCH resources of the selected PUCCH resource set. The ARI (ACK/NACK resource indicator) is a bit field in DCI, indicating a PUCCH resource.

There may be a plurality of PUCCH resource sets (K>1) for AN PUCCH resources. In this case, the UE may multiplex the AN and other UCI and then select a PUCCH resource set corresponding to the (total) size of multiplexed UCI payload. Then, the UE may transmit the multiplexed UCI in a PUCCH resource indicated by the ARI among PUCCH resources of the selected PUCCH resource set. If the PUCCH resource set supports a UCI size of 2 or fewer bits, the PUCCH resource set may include PUCCH format 0/1. If the PUCCH resource set supports a UCI size of 3 or more bits, the PUCCH resource set may include PUCCH format 2/3/4. If there are one or more PUCCH resource sets, at least one PUCCH resource set is configured for transmission of UCI with 2 or fewer bits. Therefore, if an AN PUCCH resource is indicated by an ARI and there are two or more PUCCH resource sets for the AN PUCCH resource, the UE may transmit UCI in PUCCH format 2/3/4 configured for transmission of UCI with 3 or more bits. In this case, when the UE multiplexes an AN and a plurality of SRs, the UE appends multi-bit SR information for a plurality of SR PUCCH resources to AN payload, and then transmit the multiplexed AN/SR in one of PUCCH formats 2, 3 and 4, indicated by the ARI, within a PUCCH resource set selected based on the total UCI payload size.

However, even though an AN PUCCH resource is indicated by an ARI, if there is one PUCCH resource set for the AN PUCCH resource, the UE may not use a PUCCH format 2/3/4 resource. Therefore, a method of transmitting multiplexed AN/SR in a PUCCH format 0/1 resource may be considered. For example, when the UE multiplexes an AN and a plurality of SRs, if an AN PUCCH is in PUCCH format 1, the UE may drop SR transmission in SR PUCCH resource(s) of PUCCH format 0, while transmitting an AN in an SR PUCCH resource corresponding to a positive SR with a highest priority among SR PUCCH resource(s) of PUCCH format 1 (however, if all SRs are negative SRs, the AN PUCCH is transmitted). Or, if the AN PUCCH is in PUCCH format 0, SR information for two SR PUCCHs (SR PUCCH groups) may be represented by applying up to two CS offsets to the AN PUCCH resource. That is, a CS offset corresponding to a highest-priority SR PUCCH (group) including at least one SR PUCCH for a positive SR may be applied to AN PUCCH format 0.

An AN PUCCH resource corresponding to SPS PDSCH transmission may be configured semi-statically by higher-layer signaling (e.g., RRC signaling), not indicated by an ARI. Therefore, if an AN PUCCH resource corresponding to SPS PDSCH transmission overlaps with an SR PUCCH resource, the UE may not use PUCCH format 2/3/4 when multiplexing an AN and a plurality of SRs. Therefore, a method of transmitting multiplexed AN/SR in a PUCCH format 0/1 resource. For example, when the UE multiplexes an AN and a plurality of SRs, if an AN PUCCH is in PUCCH format 1, the UE may drop SR transmission in SR PUCCH resource(s) of PUCCH format 0, while transmitting the AN in an SR PUCCH resource corresponding to a positive SR with a highest priority among SR PUCCH resource(s) of PUCCH format 1 (however, if all SRs are negative SRs, the AN PUCCH is transmitted). Or, if the AN PUCCH is in PUCCH format 0, SR information for two SR PUCCHs (SR PUCCH groups) may be represented by applying up to two CS offsets to the AN PUCCH resource. That is, a CS offset corresponding to a highest-priority SR PUCCH (group)

including at least one SR PUCCH for a positive SR may be applied to AN PUCCH format 0. However, if there are two or more PUCCH resource sets for the AN PUCCH resource, the UE may assume a specific ARI value (e.g., ARI=0) to determine an AN PUCCH resource, although the ARI does not indicate. Subsequently, the UE may (1) represent SR information for a plurality of SR PUCCH resources as multi-bit SR information and add the multi-bit SR information to AN payload, and then (2) transmit the multiplexed AN/SR in one of PUCCH format 2/3/4 resources corresponding to ARI=0 in a PUCCH resource set selected based on the total size of the multiplexed UCI payload.

In regard to the operation of "transmitting multiplexed UCI (e.g., AN/SR) in one of PUCCH formats 0 and 1" in [proposed method #1H], the UE may multiplex an AN and an SR as follows. Notably, PF0/1/2/3/4 represents PUCCH format 0/1/2/3/4.

(1) Case #1: UCI multiplexing between (single) AN and (single) SR

A. AN PF0 i. SR PF0: In the case of a positive SR, the AN is transmitted in a resource resulting from applying a CS offset to an AN PF0 resource. In the case of a negative SR, the AN is transmitted in the AN PF0 resource.

ii. SR PF1

Opt. 1: In the case of a positive SR, the AN is transmitted in a resource resulting from applying a CS offset to an AN PF0 resource. In the case of a negative SR, the AN is transmitted in the AN PF0 resource.

Opt. 2: In the case of a positive SR, the AN is transmitted in an SR PF1 resource. In the case of a negative SR, the AN is transmitted in an AN PF0 resource.

B. AN PF1 i. SR PF0: The AN is transmitted in an AN PF1 resource (SR drop)

ii. SR PF1: In the case of a positive SR, the AN is transmitted in an SR PF1 resource. In the case of a negative SR, the AN is transmitted in an AN PF1 resource.

(2) Case #2: UCI multiplexing between (single) AN and (multiple) SRs (w/single PUCCH format)

A. AN PF0 i. (Multiple) SR PF0

If SR information for at least one SR PUCCH (in a specific SR PUCCH group) is a positive SR, the AN is transmitted in a resource resulting from applying a CS offset (corresponding to the specific SR PUCCH group) to an AN PF0 resource.

In this case, a total of K SR PUCCHs are grouped into L (e.g., L=2, K>L) SR PUCCH groups, and then the respective L SR PUCCH groups may be mapped to L different CS offsets. If at least one of SRs in a specific SR PUCCH group is positive, the AN is transmitted in a resource to which a CS offset corresponding to the specific SR PUCCH group is applied.

If SR information for all SR PUCCH(s) is a negative SR, the AN is transmitted in an AN PF0 resource.

ii. (Multiple) SR PF1

Opt. 1: If SR information for at least one SR PUCCH (in a specific SR PUCCH group) is a positive SR, the AN is transmitted in a resource resulting from applying a CS offset (corresponding to the specific SR PUCCH group) to an AN PF0 resource. In this case, a total of K SR PUCCHs are grouped into L (e.g., L=2, K>L) SR PUCCH groups, and then the respective L SR PUCCH groups may be mapped to L different CS offsets. If at least one of SRs in the specific SR PUCCH group is positive, the AN is transmitted in a resource to which the CS offset corresponding to the specific SR PUCCH group is applied. If SR information for all of the SR PUCCH(s) is a negative SR, the AN is transmitted in an AN PF0 resource.

Opt. 2: If SR information for at least one SR PUCCH is a positive SR, the AN is transmitted in an SF PF1 resource corresponding to a (highest-priority) SR PUCCH among SR PUCCHs. If SR information for all of the SR PUCCH(s) is a negative SR, the AN is transmitted in an AN PF0 resource.

B. AN PF1 i. (Multiple) SR PF0: The AN is transmitted in an AN PF1 resource (SR drop).

ii. (Multiple) SR PF1: If SR information for at least one SR PUCCH is a positive SR, the AN is transmitted in an SR PF1 resource corresponding to a (highest-priority) SR PUCCH among SR PUCCHs. If SR information for all of the SR PUCCH(s) is a negative SR, the AN is transmitted in an AN PF1 resource.

(3) Case #3: UCI multiplexing between (single) AN and (multiple) SRs (w/different PUCCH formats)

A. AN PF0 i. (multiple) SR PF0+(multiple) SR PF1

Opt. 1: if SR information for at least one SR PUCCH is a positive SR and (a highest-priority) SR PUCCH among SR PUCCHs is in PF0, the AN is transmitted in a resource resulting from applying a CS offset to an AN PF0 resource. In this case, a total of SR PUCCHs or K SR PUCCHs configured with PF0 are grouped into L (e.g., L=2, K>L) SR PUCCH groups, and then the respective L SR PUCCH groups may be mapped to L different CS offsets. If at least one of the SRs of a specific SR PUCCH group is positive, the AN is transmitted in a resource to which a CS offset corresponding to the specific SR PUCCH group is applied. If the number K of the SR PUCCHs configured with PF0 is equal to or less than L, the respective K SR PUCCHs may be mapped to K different CS offsets without grouping. In this case, the AN is transmitted in a resource to which a CS offset corresponding to a positive SR PUCCH is applied. If SR information for at least one SR PUCCH is a positive SR and a (highest-priority) SR PUCCH among the SR PUCCHs is in PF1, the AN is transmitted in a (corresponding) SR PF1 resource. If SR information for all of the SR PUCCH(s) is a negative SR, the AN is transmitted in an AN PF0 resource.

Opt. 2: if SR information for at least one SR PUCCH (in a specific SR PUCCH group) is a positive SR, the AN is transmitted in a resource resulting from applying a CS offset (corresponding to the specific SR PUCCH group) to an AN PF0 resource. In this case, a total of K SR PUCCHs may be grouped into L (e.g., L=2, K>L) SR PUCCH groups, and the respective L SR PUCCH groups may be mapped to K different CS offsets. In this case, if at least one of the SRs in the specific SR PUCCH group is positive, the AN is transmitted in a resource to which a CS offset corresponding to the specific SR PUCCH group is applied. If SR information for all of the SR PUCCH(s) is a negative SR, the AN is transmitted in an AN PF0 resource.

Opt. 3: if SR information for at least one SR PUCCH (in a specific SR PUCCH group) is a positive SR, the AN is transmitted in a specific SR PF1 resource (corresponding to the specific SR PUCCH group). In this case, a total of K SR PUCCHs are grouped into L (e.g., L is the number of SRs configured with F1, K>L) SR PUCCH groups, and then the respective L SR PUCCH groups may be mapped to L different CS offsets. In this case, if at least one of the SRs in the specific SR PUCCH group is positive, the AN is transmitted in an SR PF1 resource corresponding to the specific SR PUCCH group. If SR information for all of the SR PUCCH(s) is a negative SR, the AN is transmitted in an AN PF0 resource.

B. AN PF1 i. (multiple) SR PF0+(multiple) SR PF1

Opt. 1: if SR information for at least one SR PUCCH is a positive SR and (a highest-priority) SR PUCCH among SR PUCCHs is in PF0, the AN is transmitted in an AN PF1 resource (SR drop). If SR information for at least one SR PUCCH is a positive SR and a (highest-priority) SR PUCCH among SR PUCCHs is in PF1, the AN is transmitted in a (corresponding) SR PF1 resource. If SR information for all of the SR PUCCH(s) is a negative SR, the AN is transmitted in an AN PF1 resource.

Opt. 2: If SR information for at least one SR PUCCH (in a specific SR PUCCH group) is a positive SR, the AN is transmitted in a specific ST PF1 resource (corresponding to the specific SR PUCCH group). In this case, a total of K SR PUCCHs are grouped into L (e.g., L is the number of SRs configured with F1, K>L) SR PUCCH groups, and then the respective L SR PUCCH groups may be mapped to L different SR F1 resources. In this case, if at least one of the SRs in the specific SR PUCCH group is positive, the AN is transmitted in an SR F1 resource corresponding to the specific SR PUCCH group. If SR information for all of the SR PUCCH(s) is a negative SR, the AN is transmitted in an AN PF1 resource.

Herein, an SR PUCCH group may include one or more SR PUCCHs, and one or more SR PUCCH groups may be defined.

The foregoing description is summarized as follows.

(1) Case #1

A. AN PF0+single SR PF0⇒AN+SR on AN PF0 (by CS offset)

B. AN PF0+single SR PF1⇒AN+SR on AN PF0 (by CS offset) or SR PF1 (by CH selection)

C. AN PF1+single SR PF0⇒AN only on AN PF1 (by SR drop)

D. AN PF1+single SR PF1⇒AN+SR on SR PF1 (by CH selection)

(2) Case #2

A. AN PF0+multiple SR PF0⇒AN+SR on AN PF0 (by CS offset & SR bundling)

B. AN PF0+multiple SR PF1⇒AN+SR on AN PF0 (by CS offset & SR bundling) or SR F1 (by CH selection)

C. AN PF1+multiple SR PF0⇒AN only on AN PF1 (by SR drop)

D. AN PF1+multiple SR PF1⇒AN+SR on SR PF1 (by CH selection)

(3) Case #3

A. AN PF0+(multiple) SR PF0+(multiple) SR PF1 i. Option 1

1. If SR PF0 is a positive SR and has a highest priority, AN+SR on AN F0 (by CS offset & SR bundling). In this case, SR bundling is limited to SR F0.

2. SR PF1 is a positive SR and has a highest priority, AN+SR on SR PF1 (by CH selection).

ii. Option 2

1. Irrespective of whether an SR PF is a positive SR, AN+SR on AN PF0 (by CS offset & SR bundling). In this case, both of SR PF0 and SR PF1 are subjected to SR bundling.

iii. Option 3

1. Irrespective of whether an SR PF is a positive SR, AN+SR on SR PF1 (by CH selection & SR bundling). In this case, both of SR PF0 and SR PF1 are subjected to SR bundling.

B. AN PF1+(multiple) SR PF0+(multiple) SR PF1 i. Option 1

1. If SR PF0 is a positive SR and has a highest priority, AN only on AN PF1 (by SR drop).

2. If SR PF1 is a positive SR and has a highest priority, AN+SR on SR PF1 (by CH selection).

ii. Option 2

1. AN+SR on SR PF1 (by CH selection & SR bundling). In this case, both of SR PF0 and SR PF1 are subjected to SR bundling.

[Proposed method #2] An A/N PUCCH resource and an SR PUCCH resource may overlap with each other in a slot (over all or part of the OFDM symbols of a PUCCH) on the time axis. In this case, the UE may determine whether to multiplex an A/N with a (positive) SR according to a relative relationship between the starting transmission time of (MUX PUCCH) to be used for possible multiplexing between the A/N and the (positive) SR and the starting transmission time of an SR PUCCH.

However, if the UE does not multiplex the A/N with the (positive) SR, the UE may drop transmission of one of the A/N and the (positive) SR.

For example, the UE may determine whether to multiplex the A/N with the (positive) SR depending on whether the starting transmission time of the SR PUCCH is earlier or later than the starting transmission time of the MUX PUCCH by $T_0$, as follows.

(1) If the starting transmission time of the SR PUCCH is earlier than the starting transmission time of the MUX PUCCH by $T_0$, A. one of the A/N and the (positive) SR is selected and transmitted.

i. If the UCI state of the SR is positive SR, the SR is transmitted in the SR PUCCH resource (A/N transmission drop).

ii. If the UCI state of the SR is negative SR, the AN is transmitted in the A/N PUCCH resource.

(2) If the starting transmission time of the SR PUCCH is later than (or coincides with) the starting transmission time of the MUX PUCCH by $T_0$, A. the A/N and the (positive) SR are multiplexed and transmitted (or the UCI multiplexing rule applied to the case in which an A/N PUCCH and an SR PUCCH overlap with each other over all OFDM symbols of a PUCCH is followed).

i. The A/N PUCCH is in PUCCH format.

1. If the UCI state of the SR is positive SR, the A/N is transmitted in a resource resulting from applying a CS/OCC/PRB offset to the A/N PUCCH.

2. If the UCI state of the SR is negative SR, the AN is transmitted in the A/N PUCCH resource.

ii. The A/N PUCCH is in PUCCH format 1.1.

If the UCI state of the SR is positive SR, the AN is transmitted in the SR PUCCH resource. However, if the SR PUCCH is in PUCCH format 0, only the AN is transmitted, without the SR.

2. If the UCI state of the SR is negative SR, the AN is transmitted in the A/N PUCCH resource.

iii. The A/N PUCCH is in one of PUCCH formats 2, 3 and 4.

If the UCI state of the SR is positive SR or negative SR, A. UCI payload is generated by representing the SR in explicit bit(s) and appending the SR to the A/N, and then the generated UCI is transmitted in the A/N PUCCH resource.

$T_0$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

[Proposed method #2] may be applied when an A/N PUCCH is in PUCCH format 0/2/3/4.

In the NR system, if an A/N PUCCH and an SR PUCCH differ in their starting (OFDM) symbols, a method of determining whether to multiplex an A/N with an SR by comparing the starting (OFDM) symbol (or starting time) of an A/N PUCCH for possible A/N only transmission (hereinafter, referred to as A/N PUCCH 1) and the starting (OFDM) symbol (or starting time) of the SR PUCCH has been considered. For example, if the starting (OFDM) symbol of the SR PUCCH is earlier than the starting (OFDM) symbol of A/N PUCCH 1, the UE transmits the SR PUCCH, dropping A/N transmission. On the contrary, if the starting (OFDM) symbol of the SR PUCCH is later than (or coincides with) the starting (OFDM) symbol of A/N PUCCH 1, the UE may UCI-multiplex the SR with the A/N and transmit the multiplexed UCI on a single PUCCH. The above operation is based on the expectation that the UE will first process a PUCCH having an earlier starting (OFDM) symbol. In the NR system, however, when the UE multiplexes an A/N with an SR and transmits the multiplexed A/N and SR in a single PUCCH resource, if the A/N PUCCH is in PUCCH format 0/2/3/4, the single PUCCH resource may be a new A/N PUCCH resource (hereinafter, referred to as A/N PUCCH 2) selected based on a calculated total UCI payload size of the A/N and the SR. Therefore, when the UE determines that the starting (OFDM) symbol of the SR PUCCH is later than (or coincides with) the starting (OFDM) symbol of A/N PUCCH 1 and then is to transmit the A/N and the SR on A/N PUCCH 2, it may occur that the starting (OFDM) symbol of A/N PUCCH 2 is earlier than that of the SR PUCCH. Therefore, for a more consistent UE operation, it may be preferred to compare the starting (OFDM) symbol of the SR PUCCH with the starting (OFDM) symbol of A/N PUCCH 2, instead of A/N PUCCH 1.

[Proposed method #3] An A/N PUCCH resource and an SR PUCCH resource may overlap with each other in a slot (over all or part of OFDM symbols of a PUCCH) on the time axis. Herein, the starting transmission time of a PUCCH (MUX PUCCH) to be used for possible multiplexing between an A/N and a (positive) SR may be later than the starting transmission time of the SR PUCCH. In this case, if there is an on-going SR PUCCH transmission (in a best effort manner), the UE may multiplex the A/N with the (positive) SR and transmit the multiplexed A/N and SR on the MUX PUCCH, while discontinuing the SR PUCCH transmission.

Additionally, if an A/N PUCCH resource and an SR PUCCH resource overlap with each other (over all or part of the OFDM symbols of a PUCCH) on the time axis, the starting transmission time of a PUCCH (MUX PUCCH) to be used for possible multiplexing between an A/N and a (positive) SR may be later than the starting transmission time of the A/N PUCCH. In this case, if there is an on-going A/N PUCCH transmission (in the best effort manner), the UE may multiplex the A/N with the (positive) SR and transmit the multiplexed A/N and SR on the MUX PUCCH, while discontinuing the A/N PUCCH transmission.

It is to be noted that the above operation may be applied restrictively to a UE having a specific UE capability.

If the UE identifies the presence of an A/N PUCCH resource overlapped partially with an SR PUCCH on the time domain after SR transmission, the UE may simply drop A/N transmission. However, if the UE has a sufficient capability, the UE may attempt to multiplex an A/N with an SR and transmit the multiplexed A/N and SR in a single PUCCH resource, while discontinuing an on-going SR transmission, as far as the UE is sufficiently capable (i.e., in the best effort manner). On the contrary, after the UE performs A/N transmission, a positive SR for an SR PUCCH resource overlapped partially with an A/N PUCCH on the time axis may be generated. In this case, the UE may also attempt to multiplex an A/N with the SR and transmit the multiplexed A/N and SR in a single PUCCH resource, while discontinuing an on-going A/N transmission (i.e., in the best effort manner). In [proposed method #3], the UE may support multiplexed transmission of an A/N and an SR even when the SR collides with the A/N.

[Proposed method #4] It may occur that an A/N PUCCH is in PF0 or PF1 and an A/N PUCCH resource and SR PUCCH resource(s) overlap with each other on the time axis in a slot (over all or part of the OFDM symbols of a PUCCH). In this case, the UE may apply a different UCI multiplexing rule to an A/N and an SR according to the number of SR processes corresponding to the SR PUCCH resource(s) overlapped with the A/N PUCCH resource.

For example, the UE may apply a UCI multiplexing rule to the A/N and the SR depending on whether there are one or more SR processes corresponding to the SR PUCCH resource(s) overlapped with the A/N PUCCH resource, as follows.

(1) There is on SR process (overlapped with the A/N).

A. The A/N PUCCH is in PUCCH format 0.

i. If the UCI state of the SR is positive SR, the A/N is transmitted in a resource resulting from applying a CS/OCC/PRB offset to the A/N PUCCH.

ii. If the UCI state of the SR is negative SR, the A/N is transmitted in the A/N PUCCH resource.

B. The A/N PUCCH is in PUCCH format 1.

i. If the UCI state of the SR is positive SR, the A/N is transmitted in the SR PUCCH resource.

ii. If the UCI state of the SR is negative SR, the A/N is transmitted in the A/N PUCCH resource.

(2) There are two or more SR processes (overlapped with the A/N).

A. The A/N PUCCH is in PF 0 or PF1.

i. Multiple bits representing an SR (for the plurality of SR processes) are added to the A/N, and the whole UCI is transmitted in the A/N PUCCH resource. The A/N PUCCH resource may be a resource selected based on the size of UCI payload including the A/N and the multi-bit SR, and may be in one of PF 2, PF 3 and PF 4.

SR PUCCH resource configurations corresponding to the plurality of SR processes may be identified by specific IDs and may be independent of each other.

If an A/N PUCCH is in PF0 or PF1, 2 or fewer bits is supported as an A/N payload size in the NR system. If information about one SR process is added, the UE may represent a positive/negative SR for the SR process by using a resource selection scheme instead of a PUCCH format (e.g., PF2/3/4) for a large UCI payload size with a smaller multiplexing capacity. However, if an A/N PUCCH resource overlaps with SR PUCCH resource(s) corresponding to a plurality of SR processes, the UE is required to transmit information indicating which SR process is a positive/negative SR in addition to a positive/negative SR. In this case, since a large number of bits is required to represent the SR information, it may be more efficient to use the PUCCH format (e/g. PF2/3/4) for a large UCI payload size of 3 or more bits than to use a resource selection scheme as used for one SR process.

[Proposed method #5] If an A/N PUCCH resource and a CSI SR PUCCH resource may overlap with each other in a slot (over all or part of OFDM symbols of a PUCCH) on the time axis, multiplexing between an A/N and CSI is supported as follows.

(1) The A/N PUCCH is not based on a DL assignment.
 A. If an A/N PUCCH resource corresponding to (indicated by) PDSCH(s) (and/or PDCCH(s)) which has been received (or of which the transmission has started) until a time earlier than the starting transmission time of a CSI PUCCH by $T_0$ overlaps with the CSI PUCCH resource on the time axis,
  i. the A/N and the CSI are multiplexed and transmitted on the CSI PUCCH.
 B. Else
  i. Opt. 1: The CSI is transmitted in the CSI PUCCH resource (A/N transmission drop).
  ii. Opt. 2: The A/N is transmitted in the A/N PUCCH resource (CSI transmission dropped).
(2) The A/N PUCCH resource is based on a DL assignment.
 A. The A/N and the CSI are multiplexed and transmitted in an A/N resource (reselected based on total UCI). However, if a time is too short to update the CSI (e.g., a CSI reference resource is earlier than the starting transmission time of the A/N PUCCH resource by $T_1$), the UE may not update the CSI.

The CSI reference resource means a time resource referred to for CSI calculation. A (valid) DL slot may mean a slot configured as a DL slot (for a UE) and/or a slot which is not included in a measurement gap and/or a slot included in a DL BWP for which CSI is reported.

$T_0$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.
(2) A UE processing time required to transmit an A/N (PUCCH) indicated by a PDCCH after the PDCCH is received, according to a UE capability, and a value corresponding to the UE processing time.
(3) A UE processing time required for demodulation according to a UE capability or a value corresponding to the UE processing time.
(4) A value configured by higher-layer signaling (e.g., RRC signaling) and/or DCI.
(5) A value preset between an eNB and a UE (e.g., a fixed value).

$T_1$ may be one of the following values, and represented in (OFDM) symbols.

(1) A UE processing time required to calculate and report CSI, and a value corresponding to the UE processing time.
(2) A value configured by higher-layer signaling (e.g., RRC signaling) and/or DCI.
(3) A value preset between an eNB and a UE (e.g., a fixed value).

In the NR system, when an A/N for a PDSCH based on a DL assignment (=DL scheduling DCI) is multiplexed with CSI, the multiplexed A/N and CSI may be transmitted in an A/N PUCCH resource reselected based on the total size of UCI payload of the A/N and the CSI. When an A/N PUCCH overlaps partially with a CSI PUCCH on the time axis, the multiplexing operation may also be applied. However, if a CSI reference resource is earlier than the starting transmission time of the A/N PUCCH by a UE processing time $T_0$, it may be difficult for the UE to update the CSI. Therefore, it is proposed that when it is difficult to update CSI, the CSI is not updated (notably, the non-updated CSI is still multiplexed with an A/N and reported), and otherwise, the CSI is updated, multiplexed with the A/N, and reported.

On the other hand, if the A/N does not correspond to a DL assignment-based PDSCH, the UE may multiplex the A/N with the CSI and transmit the multiplexed A/N and CSI on the CSI PUCCH. When the A/N is transmitted on the CSI PUCCH, multiplexing between the A/N and the CSI may be allowed, only when a minimum UL timing for A/N transmission is ensured. That is, only when an A/N PUCCH (and/or PDCCH(s)) received (or starting to be transmitted) until a time earlier than the starting transmission time of a CSI PUCCH by $T_1$ overlaps with the CSI PUCCH, the UE may multiplex the A/N with the CSI, and otherwise, the UE may transmit only the CSI PUCCH, while dropping the A/N transmission.

[Proposed method #6] The UE may puncture some (OFDM) symbol(s) in a specific PUCCH (or PUSCH) resource (hereinafter, referred to as UL-CH1), and transmit another PUCCH (or PUSCH) resource (hereinafter, referred to as UL-CH2) in the (OFDM) symbol(s). In this case, transmission power may be applied to UL-CH2 in the following manner.

(1) Opt. 1
 A. Transmission power is configured for UL-CH2 independently (of that of UL-CH1).
  i. If the transmission power of UL-CH2 falls within a predetermined range with respect to the transmission power of UL-CH1, the UE may transmit resources resulting from the puncturing of UL-CH1 (non-continuously).
  ii. If the transmission power of UL-CH2 is outside the predetermined range with respect to the transmission power of UL-CH1,
   1. when there is a DM-RS within the resources resulting from the UL-CH1 puncturing, the remaining resources of UL-CH1 are transmitted. Herein, the DM-RS is a reference signal for data demodulation.
   2. When there is a DM-RS within the resources resulting from the UL-CH1 puncturing, the remaining resources of UL-CH1 are not transmitted.
(2) Opt. 2
 A. The same transmission power as that of UL-CH1 is applied to UL-CH2.

(3) Opt. 3

A. Let transmission power configured for UL-CH2 independently (of UL-CH1) be denoted by TXP1 and maximum transmission power ensuring phase continuity for UL-CH1 be denoted by TXP2. Then, min(TXP1, TXP2) is applied as the transmission power of UL-CH2. Phase continuity means that there is no phase difference between resources before the UL-CH1 puncturing and resources after the UL-CH1 puncturing, except for a channel change-caused phase difference.

i. TXP2 may be any value that the UE selects according to implementation.

i. An existing UL power control (PC) rule set for UL-CH2 may be lifted exceptionally.

For example, it may occur that the UE should perform PUCCH transmission for an emergency service (e.g., URLLC) in the middle of PUSCH transmission. In this case, since the PUSCH transmission is on-going, the UE should discontinue the PUSCH transmission and transmit a PUCCH. From the perspective of PUSCH transmission, only OFDM symbols carrying the PUCCH may be punctured. In this case, the transmission power of the PUCCH in the puncturing period may be different from that of the PUSCH. Therefore, as a power amplifier (PA) configuration is initialized, a PUSCH resource transmitted before the puncturing period and a PUSCH resource transmitted after the puncturing period may have different phases (in transmission signals). The problem is attributed to a great change in the transmission power of the UE, caused by the PUCCH transmission in the middle of the PUSCH transmission. Therefore, when the UE punctures some (OFDM) symbol(s) in a PUCCH (or PUSCH) resource (i.e., UL-CH1) and transmits another PUCCH (or PUSCH) resource (i.e., UL-CH2) in the (OFDM) symbol(s), the UE may perform the following operation to reduce a phase change.

(1) The UE may set the transmission power of UL-CH2 equal to that of UL-CH1.

(2) Or, the UE performs independent UL power control for UL-CH2, wherein if there is a power difference between UL-CH2 and UL-CH1, causing a phase difference, the remaining UL-CH1 resources after the transmission of UL-CH2 are transmitted, only when the remaining UL-CH1 resources include a DM-RS.

PUCCH/PUSCH Multiplexing

[Proposed method #6.1] An A/N PUCCH resource and a PUSCH resource may overlap with each other in a slot (over all or part of the OFDM symbols of a PUCCH or PUSCH) on the time axis. In this case, the UE determines whether to multiplex an A/N with UL data (or whether to piggyback the A/N to the PUSCH) depending on whether an A/N PUCCH resource corresponding to (indicated by) PDSCH(s) (and/or PDCCH(s)) which has been received (or of which the transmission has started) until a specific time (earlier than a reference time) overlaps with the PUSCH resource.

However, if the UE does not multiplex the A/N with the UL data, the UE may drop transmission of one of the A/N and the UL data.

For example, the UE may determine whether to piggyback an A/N to a PUSCH depending on whether an A/N PUCCH resource corresponding to (or indicated by) PDSCH(s) (and/or PDCCH(s)) which has been received (or of which the transmission has started) until a time earlier than the starting transmission time (e.g., starting symbol) of the PUSCH by $T_0$ overlaps with the PUSCH on the time axis.

(1) If the A/N PUCCH resource corresponding to (indicated by) the PDSCH(s) (and/or PDCCH(s)) which has been received (or of which the transmission has started) until the time earlier than the starting transmission time of the PUSCH by $T_0$ overlaps with the PUSCH resource on the time axis, the UE multiplexes the A/N with the UL data and transmits the multiplexed A/N and UL data (i.e., the UE piggybacks the A/N to the PUSCH and transmits the PUSCH piggybacked with the A/N) (or the UE follows the UCI multiplexing rule applied to the case in which an A/N PUCCH and a PUSCH overlap with each other over all of the OFDM symbols of the PUCCH or the PUSCH).

In any other case other than (1) (e.g., if an A/N PUCCH resource corresponding to PDSCH(s) (and/or PDCCH(s)) which has been received (or of which the transmission has started/ended) after the time earlier than the starting transmission time (e.g., starting symbol) of the PUSCH by $T_0$ overlaps with the PUSCH on the time axis, if the A/N PUCCH resource corresponding to (indicated by) the PDSCH(s) (and/or PDCCH(s)) which has been received (or of which the transmission has started) until the time earlier than the starting transmission time (e.g., starting symbol) of the PUSCH by $T_0$ does not overlap with the PUSCH on the time axis, or if there is no A/N PUCCH resource corresponding to (indicated by) the PDSCH(s) (and/or PDCCH(s)) which has been received (or of which the transmission has started) until the time earlier than the starting transmission time (e.g., starting symbol) of the PUSCH by $T_0$, Opt. 1: the UL data is transmitted in the PUSCH resource (A/N transmission drop).

Opt. 2: the A/N is transmitted in the A/N PUCCH resource (PUSCH transmission drop).

For a UE of a specific version, however, an A/N for a PDSCH scheduled by a DL assignment, received after a UL grant for a PUSCH is received may not be subjected to UCI piggyback.

$T_0$ may be one of the following values, and represented in (OFDM) symbols.

(1) A UE processing time required to transmit an A/N after a PDSCH ends, according to a UE capability, and a value corresponding to the UE processing time. Or a UE processing time required for UCI (PUCCH) transmission according to a UE capability, and a value corresponding to the UE processing time.

(2) A UE processing time required to transmit an A/N (PUCCH) corresponding to a PDSCH after the PDSCH is received, according to a UE capability, and a value corresponding to the UE processing time. Or a UE processing time required for UCI (PUCCH) transmission according to a UE capability, and a value corresponding to the UE processing time.

(3) A UE processing time required to transmit an A/N (PUCCH) indicated by a PDCCH after the PDCCH is received, according to a UE capability, and a value corresponding to the UE processing time.

(3) A UE processing time required for (specific) UCI transmission according to a UE capability, or a value corresponding to the UE processing time.

(4) A UE processing time required for PUSCH transmission after a UL grant is received, according to a UE capability, or a value corresponding to the UE processing time.

(5) A value configured by higher-layer signaling (e.g., RRC signaling) and/or DCI.

(6) A value preset between an eNB and a UE (e.g., a fixed value).

[Proposed method #6.1] may also be extended to a PUCCH other than the A/N PUCCH.

Figure 14:
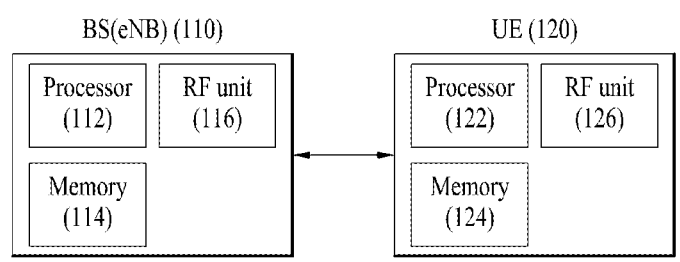
FIG. 14 illustrates a base station (BS) and a user equipment (UE) applicable to the present disclosure.

In the NR system, if the starting (OFDM) symbol (or starting time) of a PUCCH coincides with the starting (OFDM) symbol (or starting time) of a PUSCH, a UE operation of applying the same UCI multiplexing rule as applied to a case in which a PUCCH and a PUSCH fully overlap with each other on the time axis has been agreed on. Since the PUCCH and the PUSCH are multiplexed and transmitted in a PUSCH resource, if a processing time required to transmit specific UCI in the PUCCH is not secured until before the beginning of the transmission of the PUSCH resource, the PUCCH may not be multiplexed in the PUSCH. For example, if the PUCCH is a PUCCH for HARQ-ACK transmission (A/N PUCCH), the UE may transmit only an A/N for PDSCH(s) (and/or PDCCH(s)) received until a time earlier than the starting transmission time of the PUSCH by $T_0$ (a time required to transmit the A/N after receiving the PDSCH according to a UE capability). Therefore, similarly to the UCI multiplexing rule between an SR PUCCH and an A/N PUCCH ([proposed method #1]), the UE may determine whether to perform UCI piggyback for an A/N depending on whether an A/N PUCCH resource for the PDSCH(s) (and/or PDCCH(s)) received until the time earlier than the starting transmission time of the PUSCH by $T_0$ overlaps with a PUSCH resource. That is, if the A/N PUCCH resource for the PDSCH(s) (and/or PDCCH(s)) received until the time earlier than the starting transmission time of the PUSCH by $T_0$ overlaps with the PUSCH resource, the UE transmits the A/N UCI-piggybacked to the PUSCH, and otherwise, the UE may transmit only the PUSCH, dropping the A/N transmission. FIG. 14 illustrates an exemplary operation according to [proposed method #6.1].

In a modification to [proposed method #6.1], if a CSI PUCCH overlaps with a PUSCH on the time axis, the UE may UCI-piggyback CSI to the PUSCH without transmitting the CSI PUCCH. Herein, if a processing time for CSI calculation is not sufficient until the UE prepares for the PUSCH transmission, the UE may not update the CSI.

If an A/N PUCCH resource (fully or partially) overlaps with another UL channel on the time axis, the UE may operate as follows according to [proposed method #1] and [proposed method #6.1] in combination.

(1) If a UL channel overlapped with the A/N PUCCH on the time axis is not configured/indicated until a time earlier than the starting transmission time (or slot) of the A/N PUCCH by $T_0$ (e.g., the UL channel may be a PUCCH carrying an SR or a PUSCH carrying a UL-SCH TB), A. the UE transmits only the A/N in the A/N PUCCH resource (even though a UL channel overlaps with the A/N PUCCH after the time, the UE ignores the UL channel or drops/gives up the UL channel transmission).

(2) In the case where a UL channel overlapped with the A/N PUCCH on the time axis is configured/indicated until the time earlier than the starting transmission time (or slot) of the A/N PUCCH by $T_0$ (e.g., the UL channel may be a PUCCH carrying an SR or a PUSCH carrying a UL-SCH TB), A. when the UL channel is a PUCCH (hereinafter, referred to as PUCCH-A) carrying (specific) UCI (hereinafter, referred to as UCI-A), i. if an A/N PUCCH resource corresponding to (or indicated by) PDSCH(s) (and/or PUDCCH(s)) which has been received (or of which the transmission has started) until a time earlier than the starting transmission time of PUCCH-A by $T_1$ overlaps with a PUCCH-A resource on the time axis, the UE multiplexes the A/N with UCI-A and transmits the multiplexed A/N and UCI-A in a single PUCCH resource.

ii. In any other case (e.g., if the A/N PUCCH resource corresponding to (indicated by) the PDSCH(s) (and/or PUDCCH(s)) which has been received (or of which the transmission has started) until the time earlier than the starting transmission time of PUCCH-A by $T_1$ does not overlap with the PUCCH-A resource on the time axis, or if there is no A/N PUCCH resource corresponding to (indicated by) the PDSCH(s) (and/or PUDCCH(s)) which has been received (or of which the transmission has started) until the time earlier than the starting transmission time of PUCCH-A by $T_1$, the UE selects and transmits one of the A/N and UCI-A.

Opt. 1: UCI-A (only) is transmitted in the PUCCH-A resource (A/N transmission drop).

Opt. 2: The A/N (only) is transmitted in the A/N resource (UCI-A transmission drop).

Opt. 3: Opt. 1 or Opt. 2 is applied according to the state of UCI-A.

B. In the case where the UL channel is a PUSCH carrying a UL-SCH TB (or UL data), i. if an A/N PUCCH resource corresponding to (indicated by) PDSCH(s) (and/or PUDCCH(s)) which has been received (or of which the transmission has started) until a time earlier than the starting transmission time of the PUSCH by $T_2$ overlaps with a PUSCH resource on the time axis, 1. the A/N is multiplexed with the UL data and transmitted (i.e., the A/N is UCI-piggybacked to the PUSCH) (or the UCI multiplexing rule applied to the case in which an A/N PUCCH and a PUSCH fully overlap with each other over all of the OFDM symbols of the PUCCH or the PUSCH is followed).

ii. In any other case (e.g., if the A/N PUCCH resource corresponding to (indicated by) the PDSCH(s) (and/or PUDCCH(s)) which has been received (or of which the transmission has started) until the time earlier than the starting transmission time of the PUSCH by $T_2$ does not overlap with the PUSCH resource on the time axis, or of there is no A/N PUCCH resource corresponding to (indicated by) the PDSCH(s) (and/or PUDCCH(s)) which has been received (or of which the transmission has started) until the time earlier than the starting transmission time of the PUSCH by $T_2$), one of the A/N and the UL-SCH is selected and transmitted.

Opt. 1: the UL-SCH (only) is transmitted in the PUSCH resource (A/N transmission drop).

Opt. 2: the A/N (only) is transmitted in the A/N PUCCH resource (UL-SCH transmission drop).

Each of $T_0$, $T_1$, and $T_2$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for (specific) UCI transmission according to a UE capability or a value corresponding to the UE processing time.

(4) A UE processing time required for PUSCH transmission after a UL grant is received, according to a UE capability or a value corresponding to the UE processing time.

(5) A value configured by higher-layer signaling (e.g., RRC signaling) and/or DCI.

(6) A value preset between an eNB and a UE (e.g., a fixed value).

In a modification of the present disclosure, if PUCCH-PUCH overlap or PUCCH-PUSCH overlap occurs on the time axis, the UE may apply the following (generalized) UCI multiplexing rule.

(1) If a UL channel overlapped with a PUCCH resource for specific UCI on the time axis is not configured/indicated until a time earlier than the starting transmission time (or slot) of the PUCCH resource by $T_0$ (e.g., the UL channel may be a PUCCH or a PUSCH), A. the UE transmits only the UCI in the PUCCH resource (even though a UL channel overlaps with the PUCCH after the time, the UE ignores the UL channel or drops/gives up the UL channel transmission).

(2) If a PUCCH resource ($PUCCH_1$) for specific $UCI_1$ is first configured/indicated and then a PUCCH resource ($PUCCH_2$) for specific $UCI_2$ overlapped with $PUCCH_1$ on the time axis is configured/indicated until a time earlier than the starting transmission time (or slot) of the PUCCH resource ($PUCCH_1$) for $UCI_1$ by $T_0$, A. the UE multiplexes $UCI_1$ with $UCI_2$ and transmits the multiplexed $UCI_1$ and $UCI_2$ in a single PUCCH resource.

i. The single PUCCH resource may be a resource other than $PUCCH_1$ and $PUCCH_2$.

(3) If a PUCCH resource for specific UCI is first configured/indicated and then a PUSCH resource for a UL-SCH TB overlapped with the PUCCH resource on the time axis is configured/indicated until a time earlier than the starting transmission time (or slot) of the PUCCH resource for the specific UCI by $T_0$, A. the UE multiplexes the UCI with the UL-SCH and transmits the multiplexed UCI and UL-SCH in the PUSCH resource (i.e., UCI piggyback).

(4) If a UL channel overlapped with a PUSCH resource for a specific UL-SCH on the time axis is not configured/indicated until a time earlier than the starting transmission time (or slot) of the PUSCH resource for the specific UL-SCH by $T_1$ (e.g., the UL channel may be a PUCCH), A. the UE transmits only the specific UL-SCH in the PUSCH resource (even though a UL channel overlaps with the PUSCH after the time, the UE ignores the UL channel or drops/gives up the UL channel transmission).

(5) If a PUSCH resource for a specific UL-SCH is first configured/indicated and then a PUCCH resource for specific UCI overlapped with the PUSCH resource on the time axis is configured/indicated until a time earlier than the starting transmission time (or slot) of the PUSCH resource by $T_1$, A. the UE multiplexes the UCI with the UL-SCH TB and transmits the multiplexed UCI and UL-SCH TB in the PUSCH resource (i.e., UCI piggyback).

Each of $T_0$ and $T_1$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for (specific) UCI transmission according to a UE capability or a value corresponding to the UE processing time.

(4) A UE processing time required for PUSCH transmission after a UL grant is received, according to a UE capability or a value corresponding to the UE processing time.

(5) A value configured by higher-layer signaling (e.g., RRC signaling) and/or DCI.

(6) A value preset between an eNB and a UE (e.g., a fixed value).

If specific UCI is an A/N, a time when a PUCCH resource for the UCI is configured/indicated may be considered to be a time when a PDSCH corresponding to the A/N is received (ends).

The operation of first configuring/indicating a PUCCH resource for specific UCI may include configuring the PUCCH resource based on a higher-layer signal (e.g., RRC signal). For example, a PUCCH resource preconfigured by higher-layer signaling may always be considered as configured/indicated earlier than a PUCCH resource indicated by DCI. For example, $UCI_1$ and $UCI_2$ may be an SR and an A/N, respectively or (periodic) CSI and an HARQ-ACK, respectively.

It is to be noted that the following multiplexing operation may be performed for $UCI_1$ and $UCI_2$.

(1) UCI1=SR and UCI2=A/N

A. The A/N PUCCH is in PUCCH format 0.

i. If the UCI state of the SR is positive SR,

1. The A/N is transmitted in a resource resulting from applying a CS/OCC/PRB offset to the A/N PUCCH.

ii. If the UCI state of the SR is negative SR, 1. the A/N is transmitted in the A/N PUCCH resource.

B. The A/N PUCCH is in PUCCH format 1, i. If the UCI state of the SR is positive SR, 1. the A/N is transmitted in the SR PUCCH resource.

A. However, if the SR PUCCH is in PUCCH format 0, only the A/N is transmitted while the SR transmission is dropped.

ii. If the UCI state of the SR is negative SR, 1. the A/N is transmitted in the A/N PUCCH resource.

C. The A/N PUCCH is in one of PUCCH formats 2, 3 and 4.

i. If the UCI state of the SR is positive SR or negative SR,

1. UCI payload is generated by representing the SR in explicit bit(s) and appending the SR to the A/N, and the UCI is transmitted in the A/N PUCCH resource.

(2) UCI1=CSI and UCI2=A/N

A. If the A/N PUCCH is indicated by a DL assignment, i. the A/N and the CSI are multiplexed and transmitted in the A/N PUCCH resource.

B. If the A/N PUCCH is not indicated by a DL assignment, i. the A/N and the CSI are multiplexed and transmitted in the CSI PUCCH resource.

[Proposed method #7] An A/N PUCCH resource and a PUSCH resource may overlap with each other in a slot (over all or part of the OFDM symbols of a PUCCH or a PUSCH) on the time axis. The starting transmission time of the A/N PUCCH may be later than the transmission time of the PUSCH. In this case, if there is an on-going PUSCH transmission (in the best effort manner), the UE may transmit the A/N on the A/N PUCCH, discontinuing the PUSCH transmission.

Additionally, an A/N PUCCH resource and a PUSCH resource may overlap with each other in a slot (over all or part of the OFDM symbols of a PUCCH or a PUSCH) on the time axis. The starting transmission time of the A/N PUCCH may be earlier than the transmission time of the PUSCH. In this case, if there is an on-going PUCCH transmission (in the best effort manner), the UE may piggyback the A/N to the PUSCH, discontinuing the PUCCH transmission.

If the UE identifies the presence of an A/N PUCCH resource partially overlapped with the PUCCH on the time axis after transmitting the PUSCH, the UE may simply drop the A/N transmission. However, if the UE is sufficiently capable, the UE may attempt to transmit the A/N in the A/N PUCCH resource, discontinuing the on-going PUSCH transmission (i.e., in the best effort manner), if possible. By the operation of [proposed method #6.1], the UE may support the A/N transmission as much as possible even though the PUSCH collides with the A/N.

Based on the above description, (UCI) multiplexing between PUCCHs or between a PUCCH and a PUSCH in one slot is summarized as follows.

(1) Step #1: PUCCHs (referred to as resource set X) overlapped in time with a PUCCH (referred to as resource A) having the earliest starting symbol (and the earliest/last ending symbol) in a slot may be selected.

(2) Step #2: It may be determined to multiplex UCIs configured/indicated for transmission on all of PUCCHs belonging to resource A and resource set X and transmit the multiplexed UCI on a specific one PUCCH (referred to as resource N). For example, after [resource A and resource set X] are replaced with resource N, PUCCH resources to be multiplexed in the slot may be newly updated.

(3) Step #3: If there is any PUCCH overlapped in time with resource N, the procedure may start again with Step #1 (for the updated PUCCHs). In the absence of a PUCCH overlapped with resource N, it may be checked whether resource N overlaps with a PUSCH.

(4) Step #4: In the presence of a PUSCH overlapped with resource N in time, the multiplexed UCI determined to be transmitted in resource N may be transmitted piggybacked to the PUSCH. On the contrary, in the absence of a PUSCH overlapped with resource N, the multiplexed UCI may be transmitted in resource N, as determined before.

For the purpose of CSI feedback/report transmission, a specific resource may be configured semi-statically (by RRC signaling). Specifically, a single-CSI PUCCH resource for transmission of a single CSI report only and/or a multi-CSI PUCCH resource for simultaneous transmission of a plurality of CSI reports may be configured for the UE.

With a plurality of (e.g., 2) (single-)PUCCH resources (e.g., CSI PUCCH resource 1/2) configured without overlap in time in a slot, an A/N PUCCH resource indicated by DL grant DCI may overlap in time with both of CSI PUCCH resource 1 and CSI PUCCH resource 2. In this case, the following operations may be considered depending on whether a multi-CSI PUCCH resource has been configured for the UE.

1) Case in which when Step #1 and Step #2 are applied, resource set X including resource A includes all of an A/N PUCCH resource, CSI PUCCH resource 1, and CSI PUCCH resource 2.

A. If a multi-PUCCH resource has been configured for the UE (in a corresponding slot), the UE may multiplex all of a plurality of CSI reports configured for CSI PUCCH resource 1 and CSI PUCCH resource 2 and transmit the multiplexed CSI report on the A/N PUCCH.

B. If a multi-PUCCH resource has not been configured for the UE (in the slot), the UE may transmit only one highest-priority CSI report among the plurality of CSI reports configured for CSI PUCCH resource 1 and CSI PUCCH resource 2 on the A/N PUCCH. In this case, the UE may drop transmission of the remaining CSI reports or transmit (all or a part of) the CSI reports on a PUCCH (e.g., a CSI PUCCH configured/indicated for each of the CSI reports) other than the A/N PUCCH.

2) Case in which when Step #1 and Step #2 are applied, resource set X including resource A includes an A/N PUCCH resource and only CSI PUCCH resource 1 (having an earlier starting symbol).

A. The UE may transmit only a CSI report configured for CSI PUCCH resource 1 on the A/N PUCCH irrespective of whether a multi-CSI PUCCH resource has been configured for the UE (in the slot). In this case, the UE may drop transmission of the remaining CSI reports or transmit (all or a part of) the CSI reports on a PUCCH (e.g., a CSI PUCCH configured/indicated for each of the CSI reports) other than the A/N PUCCH.

With a plurality of (e.g., 2) (single-)PUCCH resources (e.g., CSI PUCCH resource 1/2) configured without overlap in time in a slot, an SR PUCCH resource and/or an SPS A/N PUCCH resource configured/indicated for transmission of an SPS PDSCH may overlap in time with both of CSI PUCCH resource 1 and CSI PUCCH resource 2. In this case, the following operations may be considered depending on whether a multi-CSI PUCCH resource has been configured for the UE.

1) Case in which when Step #1 and Step #2 are applied, resource set X including resource A includes all of an SR PUCCH and/or an SPS A/N PUCCH resource, and CSI PUCCH resources 1 and 2.

A. If a multi-PUCCH resource has been configured for the UE (in a corresponding slot), i. the UE may multiplex and transmit all of SR information and/or A/N information for an SPS PDSCH and a plurality of CSI reports configured for CSI PUCCH resource 1 and CSI PUCCH resource 2 in the multi-CSI PUCCH resource.

B. If a multi-PUCCH resource has not been configured for the UE (in the slot), i. the UE may select a CSI PUCCH carrying a best CSI report of a highest priority from among a plurality of CSI PUCCHs, and multiplex and transmit all of (the best CSI report,) SR information and/or A/N information for an SPS PDSCH on the PUCCH.

Therefore, the UE may drop transmission of the remaining CSI reports and CSI PUCCHs configured for the CSI reports or transmit (all or a part of) the CSI reports on a CSI PUCCH configured/indicated for each of the CSI reports.

2) Case in which when Step #1 and Step #2 are applied, resource set X including resource A includes an A/N PUCCH resource and only CSI PUCCH resource 1 (having an earlier starting symbol).

A. The UE may perform the following operations irrespective of whether a multi-CSI PUCCH resource has been configured for the UE (in a corresponding slot).

i. The UE may multiplex only a CSI report configured in CSI PUCCH resource 1 with SR information and/or A/N information for an SPS PDSCH and transmit the multiplexed information in CSI PUCCH resource 1. Therefore, the UE may drop transmission of the remaining CSI reports and CSI PUCCHs configured for the CSI reports, or transmit (all or a part of) the CSI reports on CSI PUCCHs configured/indicated for the CSI reports.

Further, a single PUCCH resource configured for transmission of a plurality of multiplexed CSI reports and/or one or more PUCCH resources configured for transmission of a single CSI report may overlap with a PUSCH in time in a slot. In this case, the UE may perform the following operations depending on whether a multi-CSI PUCCH resource has been configured for the UE.

1) Case in which a multi-CSI PUCCH resource has been configured (in a corresponding slot) for the UE.

A. The UE piggybacks all of a plurality of (multiplexed) CSI reports configured in one or more CSI PUCCHs overlapped with the PUSCH to the PUSCH and transmits the piggybacked CSI reports.

2) Case in which a multi-CSI PUCCH resource has not been configured (in the slot) for the UE.

A. The UE may piggyback only one highest-priority CSI report among the plurality of CSI reports configured in the one or more CSI PUCCHs overlapped with the PUSCH to the PUSCH and transmit the piggybacked CSI report. Therefore, the UE may drop transmission of the remaining CSI reports.

FIG. 14 illustrates a BS and a UE of a wireless communication system, which are applicable to embodiments of the present disclosure.

Referring to FIG. 14, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

Further, the UE may be, for example, a transmission UE, a reception UE, a wireless device, a wireless communication device, a vehicle, a vehicle equipped with a self-driving function, a connected car, an unmanned aerial vehicle (UAV), an artificial intelligence (AI) module, a robot, an AR device, a VR device, a mixed reality (MR) device, a hologram device, a public safety device, an MTC device, an IoT device, a medical device, a FinTech device (or financial device), a security device, a weather/environmental device, a 5G service-related device, or a device related to a $4^{th}$ industrial revolution field.

Further, the UE may be any of, for example, a cellular phone, a smart phone, a laptop computer, a digital broadcasting terminal, a personal digital assistant (PDA), a portable multimedia player (PMP), a navigation system slate PC, a tablet PC, an ultrabook, and a wearable device (e.g., a smart watch, smart glasses, or a head mounted display (HMD)). The HMD may be, for example, a display device which may be worn around the head. For example, the HMD may be used for VR, AR, or MR.

The UAV may be, for example, an unmanned aircraft which flies by a wireless control signal. The VR device may include, for example, a device that renders objects or a background of a virtual world. The AR device may include, for example, a device which connects an object or background in a virtual world to an object or background in a real world. The MR device may include, for example, a device which merges an object or background in a virtual world with an object or background in a real world. The hologram device may include, for example, a device which renders 306-degree stereoscopic images by recording and reproducing stereoscopic information, relying on light interference occurring when two laser beams meet. The public safety device includes, for example, a relay device or device wearable on a user's body. The MTC device and the IoT device may include, for example, a device which does not require human intervention or manipulation. For example, the MTC device and the IoT device may include a smart meter, a vending machine, a thermometer, a smart bulb, a door lock, or various sensors. The medical device may include, for example, a device used for diagnosis, treatment, relief, or prevention of diseases. For example, the medical device may be a device used for the purpose of diagnosing, treating, relieving, or correcting injury or impairment. For example, the medical device may be a device used for the purpose of examining, replacing, or modifying a structure or a function. For example, the medical device may include a device for treatment, a surgery device, an (in vitro) diagnosis device, or a hearing aid. The security device may be, for example, a device installed to avoid danger and maintain safety. For example, the security device may be a camera, a closed-circuit television (CCTV), a recorder, or a black box. The FinTech device may be, for example, a device which may provide a financial service such as mobile payment. For example, the FinTech device may include a payment device or a point of sales (PoS) terminal. The weather/environmental device may be, for example, a device which monitors or predicts weather/an environment.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method performed by a communication device in a wireless communication system, the method comprising:
   determining a first channel state information (CSI) report with a highest priority among a plurality of CSI reports, wherein the plurality of CSI reports corresponds to a plurality of Physical Uplink Control Channel (PUCCH) resources in a same time interval, and wherein the first CSI report corresponds to a first PUCCH resource among the plurality of PUCCH resources;
   based on the first PUCCH resource having PUCCH format 3 or 4, determining a second CSI report that has a highest priority among at least one of the plurality of CSI reports, other than the first CSI report, wherein the at least one of the plurality of CSI reports corresponds to at least one of the plurality of PUCCH resources having PUCCH format 2, and wherein the second CSI report corresponds to a second PUCCH resource among the at least one of the plurality of PUCCH resources having the PUCCH format 2; and
   transmitting the first CSI report and the second CSI report using the first PUCCH resource and the second PUCCH resource, respectively,
   wherein a duration of the first PUCCH resource having the PUCCH format 3 or 4 is at least four OFDM symbols, and
   wherein a duration of the second PUCCH resource having the PUCCH format 2 is equal to one OFDM symbol or two OFDM symbols.

2. The method of claim 1, wherein the duration of the first PUCCH resource having the PUCCH format 3 or 4 is at most fourteen OFDM symbols.

3. The method of claim 1, wherein the plurality of PUCCH resources are non-overlapping in time.

4. The method of claim 1, wherein the at least one of the plurality of PUCCH resources, including the second PUCCH resource, having PUCCH format 2 are non-overlapping in time with the first PUCCH resource having PUCCH format 3 or 4.

5. The method of claim 1, wherein the time interval containing the plurality of PUCCH resources is a slot that has a duration of 14 OFDM symbols.

6. The method of claim 1, wherein the plurality of PUCCH resources are configured for the UE to transmit the plurality of CSI reports.

7. The method of claim 1, wherein the communication device is configured to operate in an autonomous vehicle in the wireless communication system.

8. A communication device configured to operate in a wireless communication system, the communication device comprising:
   at least one processor; and
   at least one computer memory operably connectable to the at least one processor and storing instructions that, when executed by the at least one processor, perform operations comprising:
   determining a first channel state information (CSI) report with a highest priority among a plurality of CSI reports that corresponds to a plurality of Physical Uplink Control Channel (PUCCH) resources in a same time interval, wherein the first CSI report corresponds to a first PUCCH resource among the plurality of PUCCH resources;
   based on the first PUCCH resource having PUCCH format 3 or 4, determining a second CSI report that has a highest priority among at least one of the plurality of CSI reports which corresponds to at least one of the plurality of PUCCH resources having PUCCH format 2, wherein the second CSI report corresponds to a second PUCCH resource among the at least one of the plurality of PUCCH resources having the PUCCH format 2; and
   transmitting the first CSI report and the second CSI report using the first PUCCH resource and the second PUCCH resource, respectively,
   wherein a duration of the first PUCCH resource having the PUCCH format 3 or 4 is at least four OFDM symbols, and
   wherein a duration of the second PUCCH resource having the PUCCH format 2 is equal to one OFDM symbol or two OFDM symbols.

9. The communication device of claim 8, wherein the duration of the first PUCCH resource having the PUCCH format 3 or 4 is at most fourteen OFDM symbols.

10. The communication device of claim 8, wherein the plurality of PUCCH resources are non-overlapping in time.

11. The communication device of claim 8, wherein the at least one of the plurality of PUCCH resources, including the second PUCCH resource, having PUCCH format 2 are non-overlapping in time with the first PUCCH resource having PUCCH format 3 or 4.

12. The communication device of claim 8, wherein the same time interval containing the plurality of PUCCH resources is a slot that has a duration of 14 OFDM symbols.

13. The communication device of claim 8, wherein the plurality of PUCCH resources are configured for the UE to transmit the plurality of CSI reports.

14. The communication device of claim 8, wherein the communication device is configured to operate in an autonomous vehicle in the wireless communication system.

* * * * *